US012731355B2

(12) United States Patent
Chen et al.

(10) Patent No.: US 12,731,355 B2
(45) Date of Patent: Sep. 8, 2026

(54) DATA PROCESSING METHOD AND APPARATUS, ELECTRONIC DEVICE, COMPUTER-READABLE STORAGE MEDIUM, AND COMPUTER PROGRAM PRODUCT FOR VIRTUAL SCENE

(71) Applicant: Tencent Technology (Shenzhen) Company Limited, Shenzhen (CN)

(72) Inventors: Xiaofeng Chen, Shenzhen (CN); Yuanyuan Pei, Shenzhen (CN); Yun Ai, Shenzhen (CN); Xingqi Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 108 days.

(21) Appl. No.: 18/747,286

(22) Filed: Jun. 18, 2024

(65) Prior Publication Data

US 2024/0338918 A1 Oct. 10, 2024

Related U.S. Application Data

(63) Continuation of application No. PCT/CN2023/099927, filed on Jun. 13, 2023.

(30) Foreign Application Priority Data

Aug. 12, 2022 (CN) ........................ 202210966036.X

(51) Int. Cl.
*G06T 19/20* (2011.01)
*A63F 13/52* (2014.01)

(52) U.S. Cl.
CPC .............. *G06T 19/20* (2013.01); *A63F 13/52* (2014.09); *G06T 2200/24* (2013.01); *G06T 2219/2008* (2013.01); *G06T 2219/2024* (2013.01)

(58) Field of Classification Search
CPC ................. G06T 19/20; G06T 2200/24; G06T 2219/2008; G06T 2219/2024; G06T 13/40;
(Continued)

(56) References Cited

U.S. PATENT DOCUMENTS 12,223,564 B2 * 2/2025 Xiao ...................... A63F 13/52
12,226,694 B2 * 2/2025 Zhou ...................... A63F 13/52
(Continued)

FOREIGN PATENT DOCUMENTS

CN 111589139 A 8/2020
CN 111882674 A 11/2020
(Continued)

OTHER PUBLICATIONS

Tencent Technology, ISR, PCT/CN2023/099927, Sep. 7, 2023, 3 pgs.

*Primary Examiner* — Vijay Shankar
(74) *Attorney, Agent, or Firm* — Morgan, Lewis & Bockius LLP

(57) ABSTRACT

This application provides a method for processing data in a virtual scene performed by an electronic device. The method includes: displaying a plurality of projected avatars, each avatar corresponding to a respective one of a plurality of virtual objects in the virtual scene; detecting, among the plurality of virtual objects, a transformation of a first virtual object from a first avatar to a second avatar; and updating a first projected avatar corresponding to the first avatar to a second projected avatar corresponding to the second avatar in response to the transformation.

20 Claims, 13 Drawing Sheets

(58) Field of Classification Search
CPC .......... G06T 19/00; A63F 13/52; A63F 13/63; A63F 13/26; A63F 13/53
See application file for complete search history.

(56) References Cited

U.S. PATENT DOCUMENTS

| | | | | |
|---|---|---|---|---|
| 2013/0057574 | A1 | 3/2013 | Shimizu | |
| 2023/0033530 | A1* | 2/2023 | Zhou | A63F 13/52 |
| 2023/0050933 | A1* | 2/2023 | Xiao | A63F 13/52 |

FOREIGN PATENT DOCUMENTS

| | | | |
|---|---|---|---|
| CN | 112156464 | A | 1/2021 |
| CN | 112402946 | A | 2/2021 |
| CN | 114415998 | A | 4/2022 |
| CN | 114792284 | A | 7/2022 |
| WO | WO 2009062492 | A2 | 5/2009 |

* cited by examiner

DATA PROCESSING METHOD AND APPARATUS, ELECTRONIC DEVICE, COMPUTER-READABLE STORAGE MEDIUM, AND COMPUTER PROGRAM PRODUCT FOR VIRTUAL SCENE

CROSS-REFERENCE TO RELATED APPLICATIONS

This application is a continuation application of PCT Patent Application No. PCT/CN2023/099927, entitled "DATA PROCESSING METHOD AND APPARATUS, ELECTRONIC DEVICE, COMPUTER-READABLE STORAGE MEDIUM, AND COMPUTER PROGRAM PRODUCT FOR VIRTUAL SCENE" filed on Jun. 13, 2023, which is based on and claims priority to Chinese Patent Application No. 202210966036.X, entitled "DATA PROCESSING METHOD AND APPARATUS, ELECTRONIC DEVICE, COMPUTER-READABLE STORAGE MEDIUM, AND COMPUTER PROGRAM PRODUCT FOR VIRTUAL SCENE" filed on Aug. 12, 2022, both of which are incorporated by reference in their entirety.

FIELD OF THE TECHNOLOGY

This application relates to the image processing technology for a virtual scene, and in particular, to a data processing method and apparatus, an electronic device, a computer-readable storage medium, and a computer program product for a virtual scene.

BACKGROUND OF THE DISCLOSURE

The display technology based on graphics processing hardware has expanded the channels for sensing the environment and obtaining information. In particular, in the multimedia technologies for a virtual scene, by using a human-computer interaction engine technology, diversified interactions between virtual objects controlled by users or artificial intelligence can be implemented according to actual application needs, and the interactions have various typical application scenarios, for example, virtual scenes such as games, a real combat process between virtual objects can be simulated.

In a virtual scene of the related art, virtual objects controlled by users may wear various different avatars and display the wearing of the virtual objects to the other users in the virtual scene through projected avatars. In in related art, the projected avatars configured for global displaying are pre-loaded before entering a game, and therefore even if a virtual object changes its own avatar, other users cannot sense the change in the avatar of the virtual object.

SUMMARY

Embodiments of this application provide a data processing method and apparatus, an electronic device, a computer-readable storage medium, and a computer program product for a virtual scene, which can timely display an avatar change of a virtual object through projection, and expand the ways of information perception in the virtual scene.

Technical solutions in the embodiments of this application are implemented as follows.

An embodiment of this application provides a method for processing data in a virtual scene, performed by an electronic device, and the method including:

displaying a plurality of projected avatars, each avatar corresponding to a respective one of a plurality of virtual objects in the virtual scene;

detecting, among the plurality of virtual objects, a transformation of a first virtual object from a first avatar to a second avatar; and updating a first projected avatar corresponding to the first avatar to a second projected avatar corresponding to the second avatar in response to the transformation.

An embodiment of this application provides an electronic device, including:

a memory, configured to store a computer-executable instruction; and a processor, configured to, when executing the computer-executable instruction stored in the memory, cause the electronic device to perform a method for processing data a virtual scene according to the embodiments of this application.

An embodiment of this application provides a non-transitory computer-readable storage medium, having a computer-executable instruction stored therein, and the computer-executable instruction, when executed by a processor of an electronic device, causing the electronic device to perform a method for processing data a virtual scene according to the embodiments of this application.

The embodiments of this application have the following beneficial effects.

When a first virtual object is transformed from a first avatar to a second avatar, a first projected avatar corresponding to the first avatar is updated to a second projected avatar corresponding to the second avatar, to display a change in the avatar of the virtual object by using a projected avatar as a medium. Compared with sensing an avatar only in a face-to-face mode in the related art, the ways of sensing a virtual avatar in a virtual scene are expanded, and the avatar display is more flexible and free, and the user experience is improved.

DESCRIPTION OF EMBODIMENTS

Figure 1A:
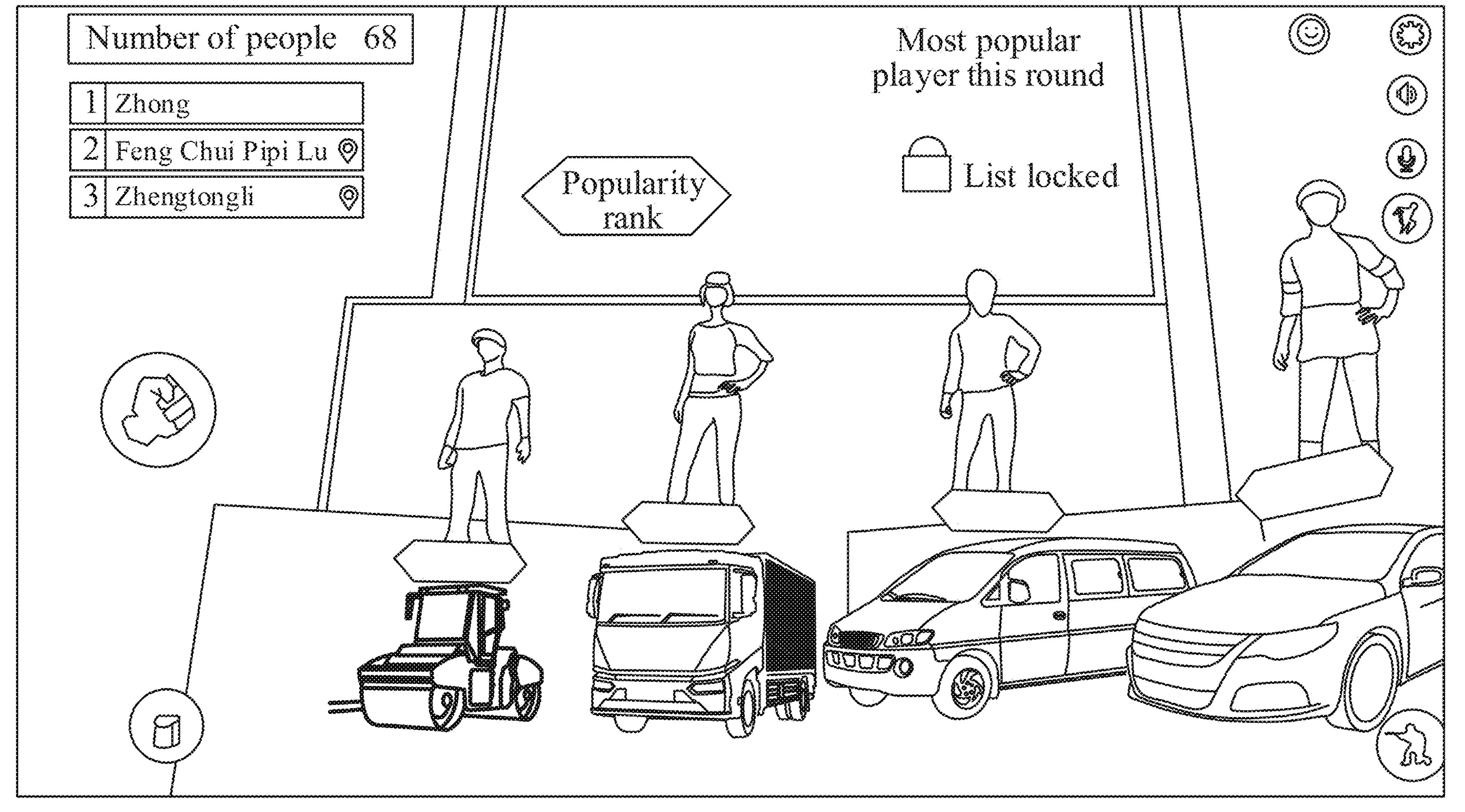
FIG. 1A is a schematic diagram of a wearing display method according to the related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but "some embodiments" may be the same subset or different subsets of all the possible embodiments, and can be combined with each other without conflict.

In the following descriptions, the terms "first/second/third" are only used to distinguish similar objects and do not represent specific sorting of objects. The terms "first/second/third" can be interchanged in specific order or sequence, if allowed, to enable the embodiments described herein to be implemented in order other than those illustrated or described herein.

Unless otherwise defined, meanings of all technical and scientific terms used in this specification are the same as those usually understood by a person skilled in the art to which this application belongs. The terms used in the specification of this application are merely intended to describe objectives of the embodiments, but are not intended to limit this application.

Before the embodiments of this application are further described in detail, a description is made on nouns and terms in the embodiments of this application, and the nouns and terms in the embodiments of this application are applicable to the following explanations.

1) Client: A client is an application running in a terminal for providing various services, for example, an instant messaging client, a video playback client, or a game client.

2) In response to: The term is configured for representing a condition or state on which a performed operation depends, and when the dependent condition or state is met, one or more operations performed may be in real time or have a set delay; unless otherwise specified, there is no restrictions on the order of a plurality of operations performed.

3) Virtual scene: A virtual scene is a virtual scene displayed when an application is run in a terminal. The virtual scene may be a simulated environment of the real world, a semi-simulated and semi-fictional virtual environment, or a purely fictional virtual environment. The virtual scene may be any one of a two-dimensional virtual scene, a 2.5-dimensional virtual scene, or a three-dimensional virtual scene. The dimensions of the virtual scene is not limited in the embodiments of this application. For example, the virtual scene may include sky, land, or ocean, the land may include environmental elements such as deserts and cities, and a user may control a virtual object to carry out a movement in the virtual scene. The movement includes, but is not limited to: at least one of body posture adjusting, crawling, walking, running, riding, jumping, driving, picking up, shooting, attacking, or throwing. The virtual scene may be a virtual scene displayed from a first person perspective (for example, a player acts as a virtual object in a game from the perspective of the player); or may be a virtual scene displayed from a third person perspective (for example, a player chases a virtual object in a game); or may be a virtual scene displayed from a bird's-eye perspective. The perspectives described above may be switched freely.

4) Virtual object: Virtual objects are various avatars of people and objects that can interact in a virtual scene, or movable objects in a virtual scene. The movable objects may be virtual characters, virtual animals, anime characters, or the like. The virtual scene may include a plurality of virtual objects. Each virtual object has a shape and a volume in the virtual scene. The virtual object may be a user character controlled through an operation on a client, or artificial intelligence (AI) trained in a combat in a virtual scene, or may be a non-player character (NPC) set in an interaction in a virtual scene.

5) Avatar: An avatar is an ontology avatar of a virtual object in a virtual scene and represents attire of a virtual object that moves and interacts in the virtual scene. In an electronic game, a player usually appears in various scenes by using a virtual character avatar to represent the player. The virtual character may usually be set up independently by the player, and may perform various interactive behaviors with the scenes.

6) Projected avatar: An ontology of a virtual object is an avatar configured for public display, which may be interpreted as a three-dimensional model of an avatar on a public screen, may be presented to all players in a game, and is completely consistent with the appearance of an ontology character of the virtual object controlled by a player. The projected avatar is not only static, but can also perform various interactive actions according to settings by the player.

7) Holographic projection: Holographic projection is a type of three-dimensional technology, originally refers to a technology of recording and reproducing a real three-dimensional image of an object by using the principle of interference, and refers to a three-dimensional virtual character model technology of presenting an image to a player as a projected avatar through technology in the embodiments of this application.

Figure 1B:
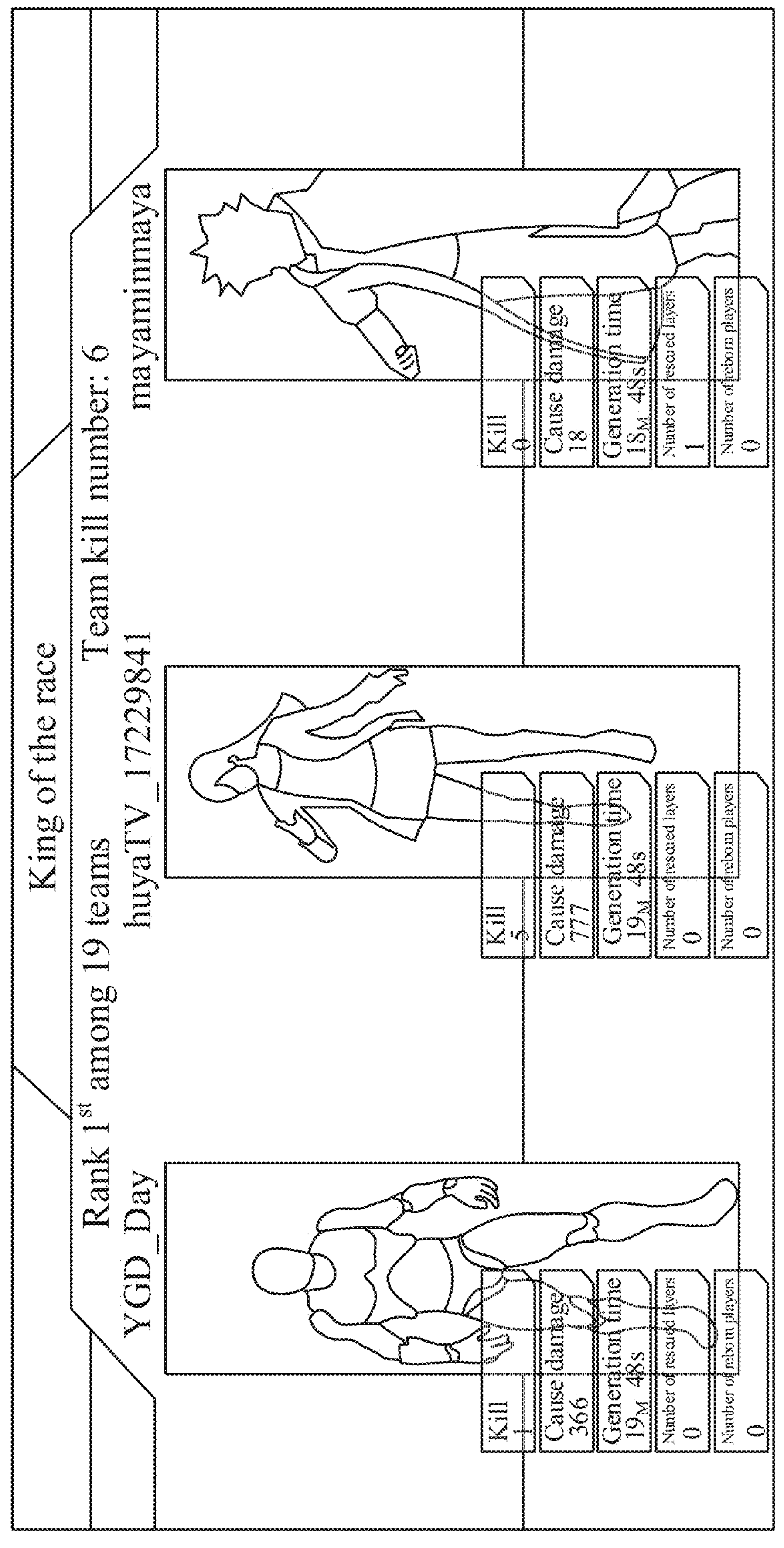
FIG. 1B is another schematic diagram of a wearing display method according to the related art.

In a virtual scene of the related art, a virtual object controlled by a user may wear various different avatars and display the wearing of the virtual object to other users in the virtual scene through a projected avatar. In an example, referring to FIG. 1A, FIG. 1A is a schematic diagram of a wearing display method according to the related art. In an example, referring to FIG. 1B, FIG. 1B is another schematic diagram of a wearing display method according to the related art.

As shown in FIG. 1A, during match loading, avatar components of players meeting a display condition are read and applied to fixed projected avatars by using fixed character actions, and therefore can be sensed by all players. Therefore, a high display efficiency and human-machine interaction efficiency are provided for the displayed players. However, when a displayed player makes an appearance change, the other players cannot associate the displayed player with a projected avatar of the player on a booth, and cannot sense in real time a change in the attire of the displayed player. As shown in FIG. 1B, avatar cards of currently best performing player are displayed in a match, and players may customize and edit, outside the match, avatar cards to be displayed. The players need to independently edit and produce avatar cards, and therefore the efficiency of human-computer interaction is limited.

The embodiments of this application provide a data processing method and apparatus, an electronic device, a computer-readable storage medium, and a computer program product for a virtual scene, which can display an avatar change of a virtual object in real time through projection, thereby improving the real-time level of information perception in the virtual scene. The following describes an exemplary application of the electronic device according to an embodiment of this application.

To facilitate an easier understanding of the data processing method for a virtual scene provided in the embodiments of this application, an exemplary implementation scenario of the data processing method for a virtual scene provided in the embodiments of this application is first explained. The virtual scene may be outputted entirely based on a terminal, or may be outputted based on collaboration between a terminal and a server.

In some embodiments, the virtual scene may be an environment for game characters to interact. For example, the game characters perform a combat in the virtual scene, and by controlling actions of the virtual objects, mutual interactions between two parties can be performed in the virtual scene.

Figure 2:
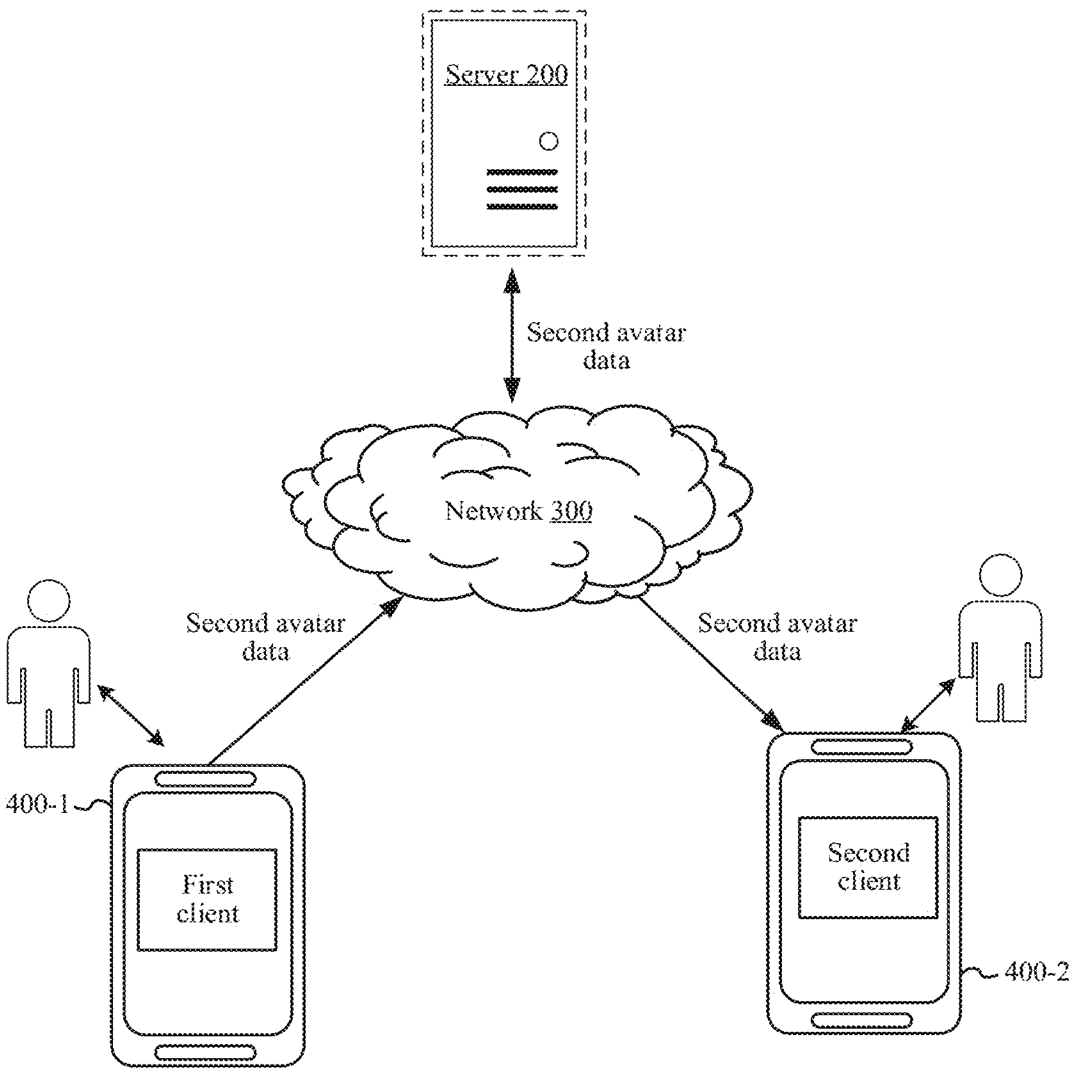
FIG. 2 is a schematic diagram of an application mode of a data processing method for a virtual scene according to an embodiment of this application.

In some embodiments, referring to FIG. 2, FIG. 2 is a schematic diagram of an application mode of a data processing method for a virtual scene according to an embodiment of this application, applied to a terminal 400-1, a terminal 400-2, and a server 200, and generally, applied to an application mode of relying on a computing capability of the server 200 to complete computing of a virtual scene and outputting a virtual scene at the terminal 400-1 and the terminal 400-2.

In an example, a first account logs into a first client (for example, a network-version game application) run in the terminal 400-1, a virtual object controlled by the first account is a first virtual object, and the client receives an avatar change operation of the first account. The first virtual object displayed by the first client run in the terminal 400-1 is transformed from a first avatar to a second avatar, and the first client generates second avatar data corresponding to the second avatar and transmits the second avatar data to the server 200. The server 200 transmits the second avatar data to a second client run in the terminal 400-2. A second account logs into the second client run in the terminal 400-2 and a virtual object controlled by the second account is a second virtual object. The terminal 400-1 and the terminal 400-2 perform rendering based on the second avatar data, to obtain a second projected avatar corresponding to the second avatar, and the first client of the terminal 400-1 and the second client of the terminal 400-2 display the second projected avatar corresponding the second avatar of the first virtual object and no longer display a first projected avatar corresponding to the first avatar.

In some embodiments, a terminal may implement the data processing method for a virtual scene provided in the embodiments of this application by running a computer program. For example, the computer program may be a native program or a software module in an operating system; may be a native application (APP), that is, an application that can run after being installed in an operating system, for example, a game APP (that is, the client described above), or a live streaming APP; or may be an applet, that is, an application that can run only after being downloaded to a browser environment; or may be a game applet that can be embedded into any APP. To sum up, the computer program may be any form of application, module, or plug-in.

The embodiments of this application may be implemented by using the cloud technology, which refers to a hosting technology that unifies series of resources such as hardware, software, and network in a wide area network or a local area network, to implement computing, storage, processing, and sharing of data.

The cloud technology is a generic term for a network technology, an information technology, an integration technology, a management platform technology, an application technology, and the like applied based on a cloud computing commercial mode, and can form a pool of resources, which is used on demand and is flexible and convenient. The cloud computing technology is to become an important support. Back-end services of a technology network system require a huge amount of computing and storage resources.

In an example, the server 200 may be an independent physical server, or a server cluster or distributed system composed of a plurality of physical servers, or may be a cloud server for providing basic cloud computing services, such as a cloud service, a cloud database, cloud computing, a cloud function, cloud storage, a network service, cloud communication, a middleware service, a domain name service, a security service, a CDN, big data, and an artificial intelligence platform. The terminal may be a smartphone, a tablet computer, a notebook computer, a desktop computer, a smart speaker, a smartwatch, or the like, but is not limited thereto. The terminal and the server 200 may be directly or indirectly connected in wired or wireless communication mode; this is not limited in the embodiments of this application.

Figure 3:
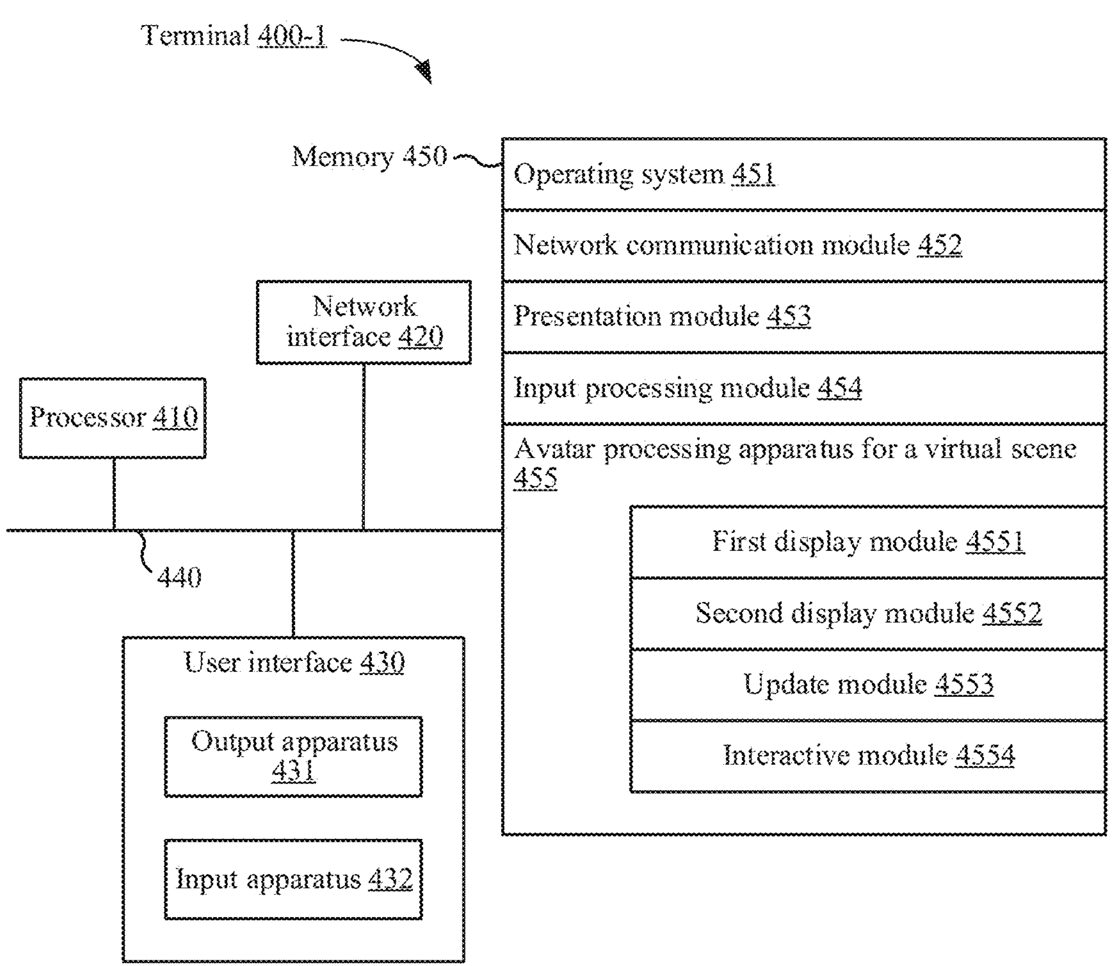
FIG. 3 is a schematic structural diagram of an electronic device for a data processing method for a virtual scene according to an embodiment of this application.

Referring to FIG. 3, FIG. 3 is a schematic structural diagram of an electronic device for a data processing method for a virtual scene according to an embodiment of this application. For example, the electronic device is a terminal. A terminal 400-1 shown in FIG. 3 includes: at least one processor 410, a memory 450, at least one network interface 420, and a user interface 430. The components in the terminal are coupled by using a bus system 440. The bus system 440 is configured to implement connection and communication between the components. In addition to a data bus, the bus system 440 further includes a power supply bus, a control bus, and a state signal bus. But, for ease of clear description, all types of buses in FIG. 3 are marked as the bus system 440.

The processor 410 may be an integrated circuit chip with signal processing capabilities, such as a general-purpose processor, a digital signal processor (DSP), or other programmable logic devices, discrete gate or transistor logic devices, or discrete hardware components, where a general-purpose processor may be a microprocessor or any conventional processor.

The user interface 430 includes one or more output apparatuses 431 that enable media content to be presented, including one or more speakers and/or one or more visual displays. The user interface 430 also includes one or more input apparatuses 432, including a user interface component that facilitates user input, such as a keyboard, a mouse, a microphone, a touchscreen display, a camera, or other input buttons and controls.

The memory 450 may be removable, non-removable, or a combination thereof. Exemplary hardware devices include a solid state memory, a hard disk drive, an optical disc drive, and the like. In one embodiment, the memory 450 includes one or more storage devices located physically away from the processor 410.

The memory 450 includes a transitory memory or a non-transitory memory, or may include both a transitory memory and a non-transitory memory. The non-transitory memory may be a read-only memory (ROM) and the non-transitory memory may be random access memory (RAM). The memory 450 described in this embodiment of this application aims to include any suitable type of memories.

In some embodiments, the first memory 450 can store data to support various operations, examples of which include programs, modules, and data structures, or subsets or supersets thereof, as illustrated below.

An operating system 451 includes system programs for processing various basic system services and performing hardware-related tasks, such as a framework layer, a core library layer, or a driver layer, for implementing various basic services and processing hardware-based tasks.

A network communication module 452 is configured to reach another electronic device via one or more (wired or wireless) network interfaces 420. For example, the network interface 420 includes: Bluetooth, wireless fidelity (WiFi), and universal serial bus (USB), or the like.

A presentation module 453 is configured to present information through one or more output devices 431 (for example, a display screen or a speaker) associated with a user interface 430 (for example, a user interface for operating a peripheral device and displaying content and information).

An input processing module 454 is configured to detect one or more user inputs or interactions from one or more input devices 432, and translate the detected input or interaction.

In some embodiments, the data processing apparatus for a virtual scene provided in this embodiment of this application may be implemented in a software mode. FIG. 3 illustrates a data processing apparatus 455 for a virtual scene stored in the memory 450, which may be software in the form of a program, a plug-in, or the like, including the following software modules: a first display module 4551, a second display module 4552, an update module 4553, and an interactive module 4554; these modules are logical and therefore can be combined or further divided according to functions to be implemented. The functions of the modules are described in the following.

The data processing method for a virtual scene provided in the embodiments of this application is described in combination with the exemplary applications and implementations of the terminal provided in the embodiments of this application.

The following describes a data processing method for a virtual scene provided in the embodiments of this application. As mentioned above, the electronic device for implementing the data processing method for a virtual scene in the embodiments of this application may be a terminal. Therefore, the execution bodies of the operations are not repeated in the following text.

Figure 4A:
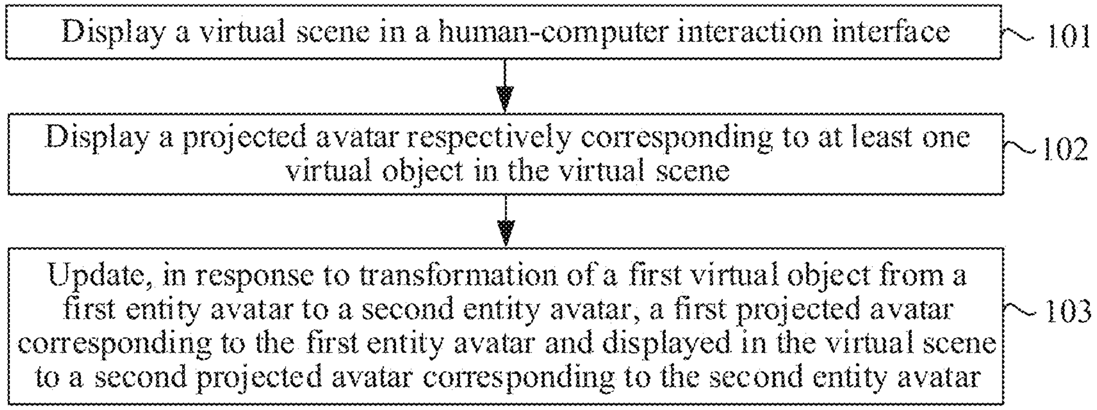
FIG. 4A to FIG. 4D are schematic flowcharts of a data processing method for a virtual scene according to an embodiment of this application.

Referring to FIG. 4A, FIG. 4A is a schematic flowchart of a data processing method for a virtual scene according to an embodiment of this application. A description is provided in combination with operation 101 to operation 103 in FIG. 4A.

Operation 101: Display a virtual scene in a human-computer interaction interface.

In an example, the human-computer interaction interface here is an interface of the first client. A user using the terminal 400-1 may log into the first client run in the terminal 400-1 through a first account, and the virtual scene may be an interaction scene of a game.

Operation 102: Display a projected avatar respectively corresponding to at least one virtual object in the virtual scene.

In an example, the projected avatar is actually for displaying an avatar of an ontology of the virtual object. Due to the fact that the virtual object performs various interactions in the virtual scene, the position of the virtual object in the virtual scene is not fixed. In addition, the volume of the ontology of the virtual object is relatively small. Therefore, it is difficult to display an avatar of each virtual object through the ontology of the virtual object. Therefore, the avatar of the ontology of the virtual object is transformed into a projected avatar through projection, and the projected avatar is displayed in the virtual scene. The projected avatar does not change due to a position movement or an interaction action of the virtual object, and therefore a good display effect can be obtained. The following specifically describes the projection mode. The projection here may be a holographic projection technology. Holographic projection is a type of holographic imaging, and an image obtained by projecting an ontology of a virtual object in a static state onto a holographic board is a projected avatar. The projection here may alternatively include capturing a picture in which an ontology of a virtual object is located in a static state, and the captured image serves as a projected avatar.

In an example, in operation 102, a projected avatar respectively corresponding to at least one virtual object is actually displayed in the human-computer interaction interface of the first client, and a virtual object controlled by a second account and a virtual object controlled by a first account may be displayed in the human-computer interaction interface run in the first client. Here, the second account may be an account logged into the second client run in the terminal 400-2.

In an example, the avatar is an ontology avatar of a virtual object in a virtual scene, and represents the attire of the ontology of the virtual object moving and interacting in the virtual scene. The projected avatar is a projection of the avatar of the virtual object, is an avatar character, of the virtual object, configured for public displaying, and may be interpreted as an avatar projected on a public screen and presented to all players in a game for watching. The projected avatar is a three-dimensional model completely consistent with the appearance of an ontology character of the virtual object controlled by a player. The projected avatar is not only static, but can also perform various interactive actions according to settings by the player.

Figures 4B, 4C:
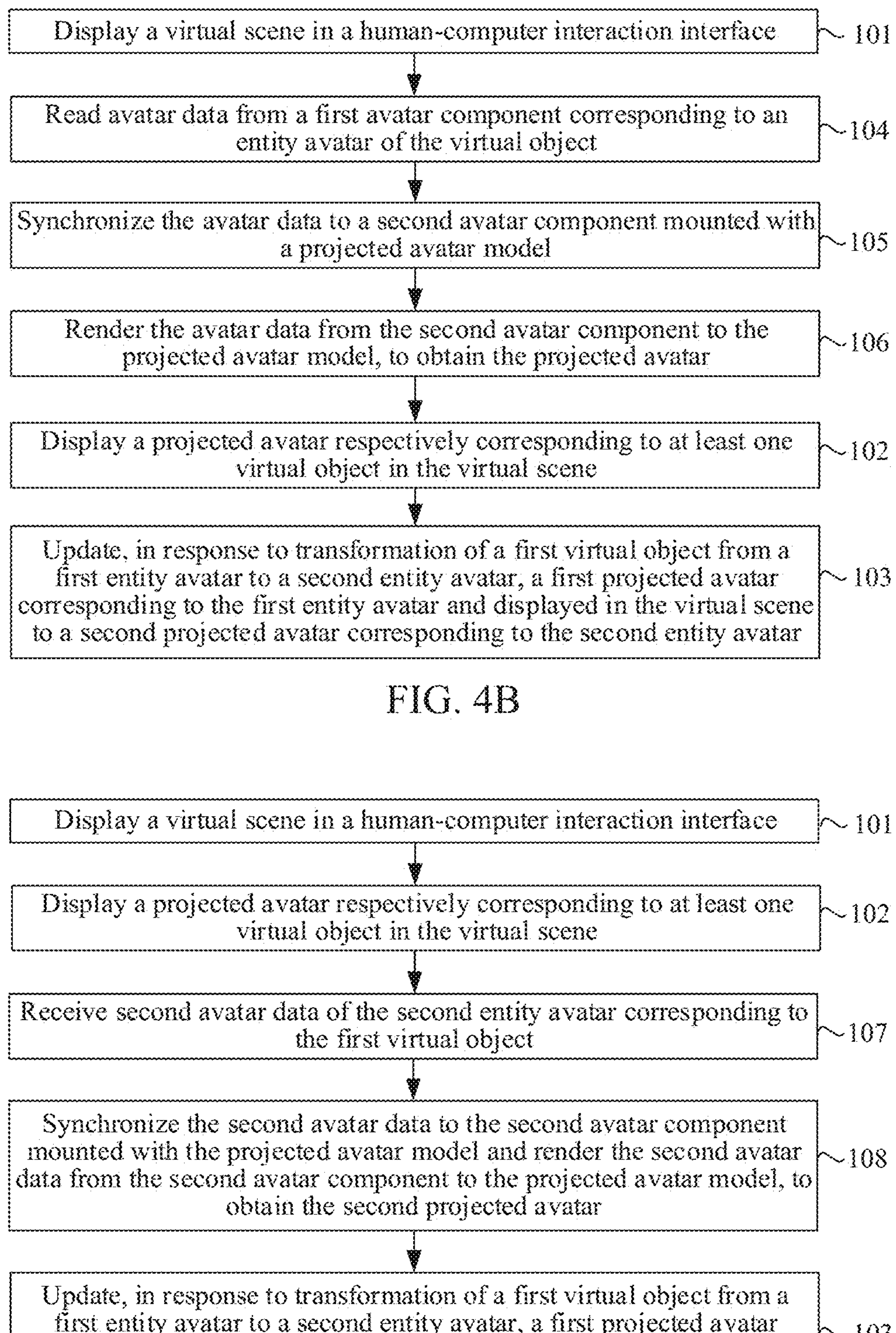

In some embodiments, referring to FIG. 4B, FIG. 4B is a schematic flowchart of a data processing method for a virtual scene according to an embodiment of this application. Before displaying the projected avatar respectively corresponding to the at least one virtual object in the virtual scene, operation 104 to operation 106 shown in FIG. 4B are performed for each virtual object.

Operation 104: Read avatar data from a first avatar component corresponding to an avatar of the virtual object.

Figure 8:
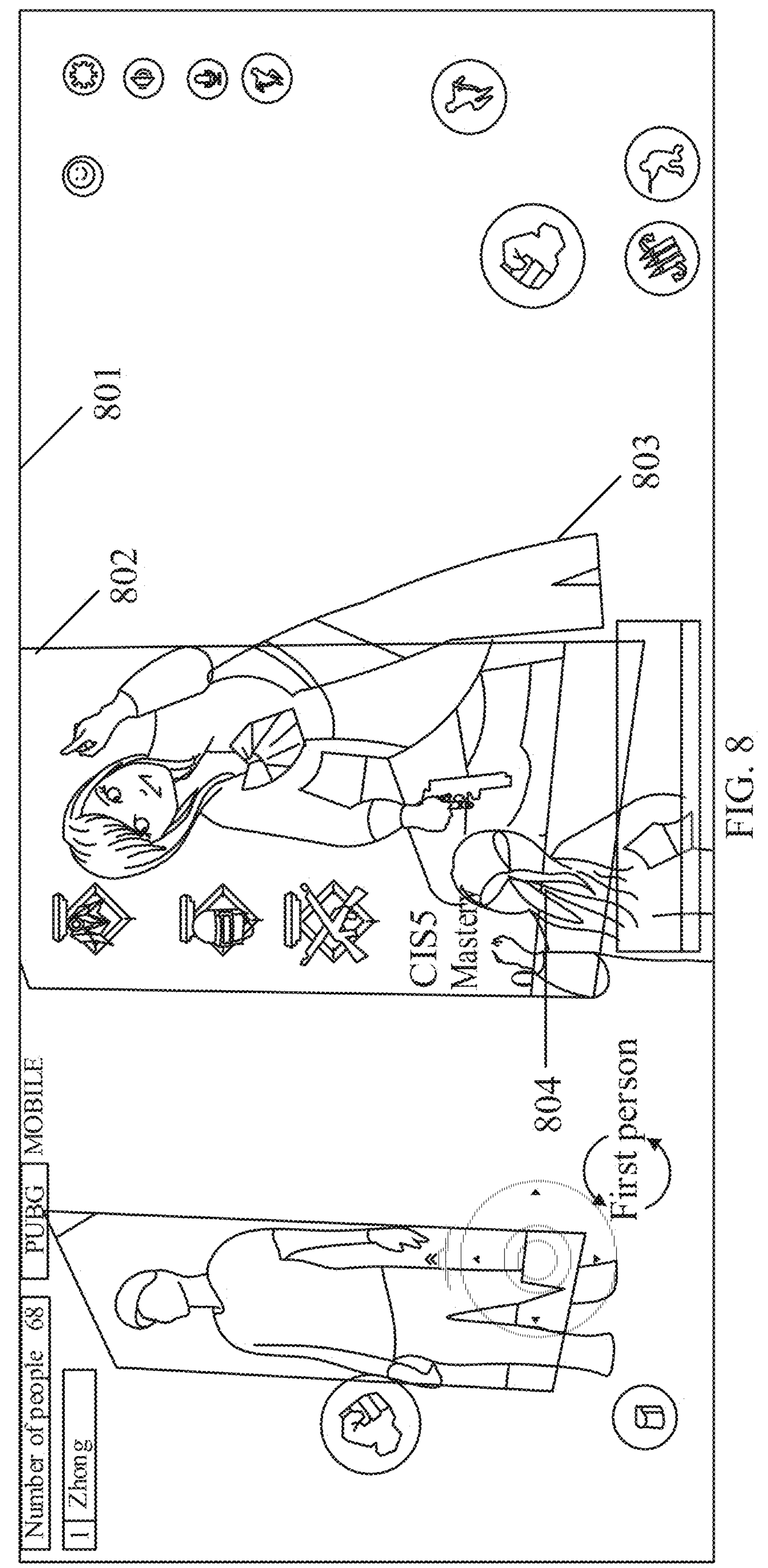
FIG. 8 is an interface diagram of a data processing method for a virtual scene according to an embodiment of this application.

In an example, referring to FIG. 8, an avatar 804 of a virtual object is displayed in a human-computer interaction interface 801. For example, the avatar may be an avatar of an ontology of a virtual character engaged in an interactive combat in a virtual scene. The avatar has a mounted first avatar component, which has avatar data configured for describing the avatar stored therein. Avatar data corresponding to each wearing component is stored in a form of an avatar array. The wearing components include helmets, gloves, shoes, representative postures, representative actions, or the like. The avatar data is actually equipment data corresponding to each wearing component. For example, the equipment data may be configured for representing clothing styles such as helmets, posture styles such as representative actions, and text output styles such as performance titles; all of these are data stored in the avatar component to describe the avatar of the virtual object.

Operation 105: Synchronize the avatar data to a second avatar component mounted with a projected avatar model.

In an example, referring to FIG. 8, the avatar 804 of the virtual object is displayed in the human-computer interaction interface 801, and a projected avatar 803 of the virtual object is displayed in a projection card 802. The projected avatar is obtained by rendering based on the projected avatar model, and therefore the projected avatar model also has a mounted second avatar component. To render the projected avatar, the avatar data needs to be synchronized to the second avatar component mounted with the projected avatar model, so that the avatar data configured for describing the projected avatar in the second avatar component is consistent with the avatar data in operation 104, and that a subsequent rendered projected avatar can be ensured to be a projection of the avatar.

Operation 106: Render the avatar data from the second avatar component to the projected avatar model, to obtain the projected avatar.

In some embodiments, in operation 106, rendering the avatar data from the second avatar component to the projected avatar model, to obtain first projected avatar may be implemented through the following technical solution: transmitting a rendering instruction to a processor when performance of a terminal in which the virtual scene runs is less than a performance threshold, to enable the processor to render first avatar data to the projected avatar model at a time in response to the rendering instruction, so as to obtain the first projected avatar. An overall model can be formed a low-end machine (performance of the terminal is less than a performance threshold, where the performance may be the number of graphics cards or the number of processors, and the corresponding performance threshold may be a number-of-graphics-cards threshold or a number-of-processors threshold). The overall model is configured for preparing rendering resources and performing rendering. The number of times of initiating a rendering instruction (DrawCall) is reduced by using a non-detachable mesh mode. When the performance of the terminal running a virtual scene is equal to or greater than the performance threshold, the projected avatar model is decomposed into a plurality of part models, and a rendering instruction is transmitted to a processor for each part model, so that the processor render, in response to the rendering instructions, first avatar data to the part models in parts a plurality of times by using the part models as rendering units and merge a plurality of rendered part models, to obtain a first projected avatar. A multi-model strategy may be configured for reducing the number of models on a high-end machine (performance of the terminal is equal to or greater than a performance threshold, where the performance may be the number of graphics cards or the number of processors, and the corresponding performance threshold may be a number-of-graphics-cards threshold or a number-of-processors threshold). That is, the mode of rendering in parts (rendering instructions Drawcall are initiated in parts) is stilled configured, but part decomposition is not excessively thorough and redundant parts are discarded. For example, medals and medal bases in the projected avatar may be integrated and formed into one model; data such as scores and season information is configured as part of a three-dimensional user interface; and the number of equipment such as backpacks and helmets is reduced, and generation of unnecessary components for a character is reduced, so as to reduce the number of models. Through the embodiments of this application, different rendering mechanisms may be adopted for machines having different performance, the rendering effect is improved through a plurality of times of rendering, and the performance consumption is reduced through overall rendering, thereby achieving a balance between the performance and the display effect.

In some embodiments, in operation 102, displaying the projected avatar respectively corresponding to the at least one virtual object in the virtual scene may be implemented through the following technical solution: performing any of the following processing: displaying an avatar view prop in the virtual scene and displaying in the avatar view prop a projected avatar respectively corresponding to the at least one virtual object in response to a trigger operation on the avatar view prop; automatically displaying the projected avatar corresponding to the at least one virtual object in response to that the at least one virtual object meets a projection display condition; or automatically displaying, for any one of the at least one virtual object, a projected avatar respectively corresponding to the virtual object. By displaying a projected avatar by triggering an avatar view prop, more diversified ways of interaction can be provided for users, thereby enhancing the diversity of human-computer interaction; and by displaying a projected avatar in an automatic display mode, the user operation time can be saved, thereby improving the human-computer interaction efficiency.

In an example, the displaying the projected avatar respectively corresponding to the at least one virtual object in the avatar view prop may be implemented through the following technical solution: displaying at least one candidate virtual object in the avatar view prop and displaying in the avatar view prop the projected avatar respectively corresponding to the at least one virtual object in response to a selection operation on the at least one candidate virtual object; or The avatar view prop is triggered by a projection operation. The projection operation may be a throwing operation on the avatar view prop. A throwing direction is a projection direction. A shape of the avatar view prop changes to a projection card shown in FIG. 5 after throwing. The avatar view prop displays candidate virtual objects. The candidate virtual objects are at least virtual objects matched to a current match. In response to a view operation on a candidate virtual object, a projected avatar of the candidate virtual object is displayed in the avatar view prop. Through the embodiments of this application, a virtual object for which a projected avatar is displayed can be adjusted flexibly, so as to meet the view needs of users.

In an example, the displaying the projected avatar respectively corresponding to the at least one virtual object in the avatar view prop may be implemented through the following technical solution: displaying in the avatar view prop a projected avatar corresponding to at least one virtual object within a set area, where the set area is an area having a physical distance with the avatar view prop less than a second physical distance threshold. These virtual objects are not selected by a user, but are filtered by a set area. For example, if a location of an avatar view prop is at a location A, a projected avatar of a virtual object in the vicinity the location A is displayed. That is, if a physical distance between the location of the virtual object and the location A is less than the second physical distance threshold, the projected avatar of the virtual object in the vicinity can be automatically displayed through the embodiments of this application. Due to the possibility of interaction between the virtual object in the vicinity and the virtual object triggering a projected avatar prop, projected avatars of these virtual objects have reference value for the virtual object triggering the prop. The projected avatar prop even has a function of an enemy detector, so that the information perception capability of the virtual object is improved.

Figure 5:
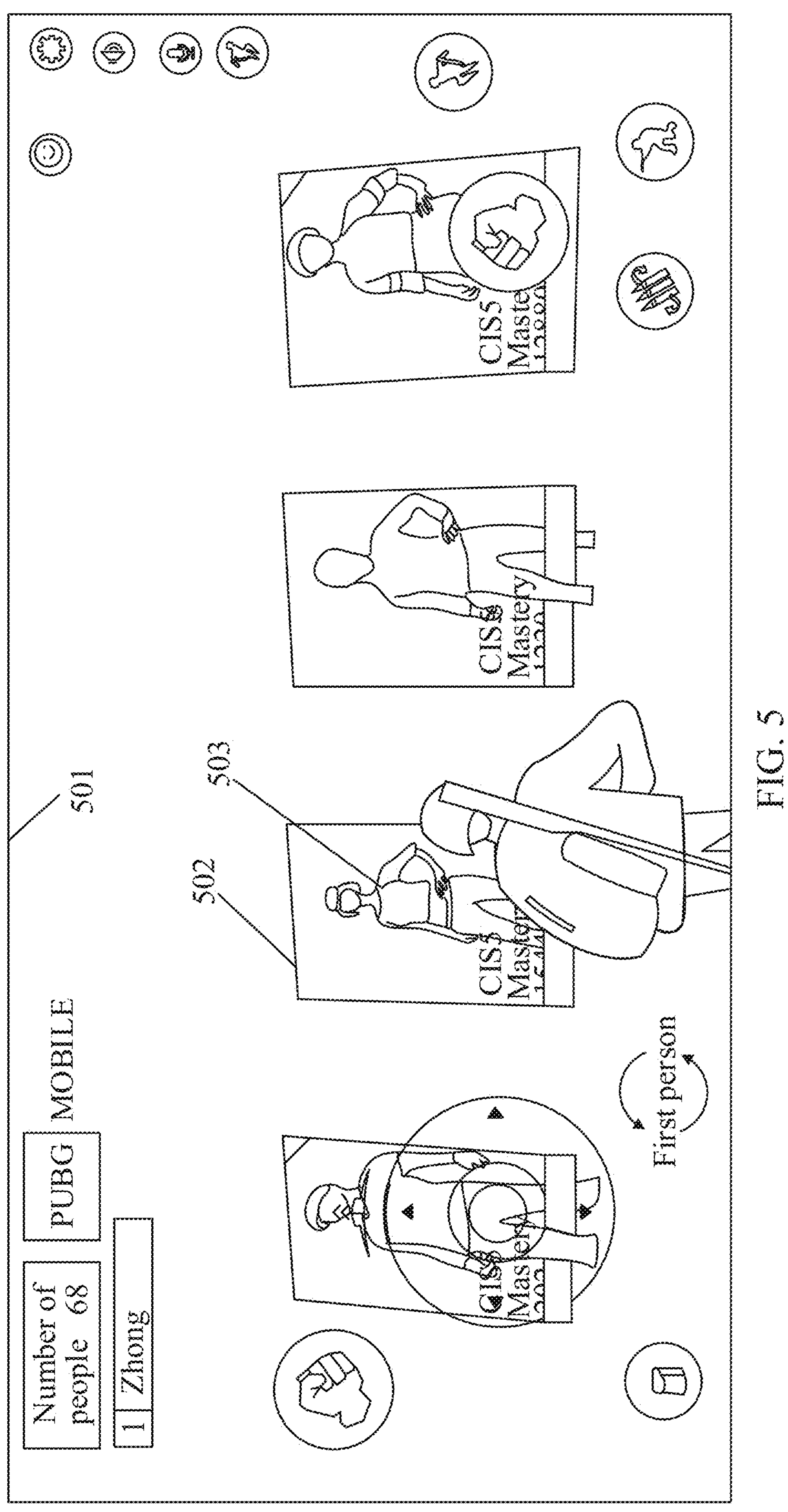
FIG. 5 is an interface diagram of a data processing method for a virtual scene according to an embodiment of this application.

In an example, the projected avatar is displayed in a projected avatar prop, and a location for displaying the projected avatar prop may be automatically selected based on an environment, for example, an environmental parameter meets a display condition, specifically, an environmental brightness is within a standard brightness range, or a blank area of the environment is within a standard area range; the location of the projected avatar prop may alternatively be obtained based on a projection operation, for example, an avatar view prop is triggered by a projection operation, the projection operation may be a throwing operation on the avatar view prop, a throwing direction is a projection direction, and a shape of the triggerable avatar view prop changes to a projection card shown in FIG. 5 after throwing.

In some embodiments, the projection display condition includes at least one of the following: an avatar score of the virtual object exceeds a score threshold, where the avatar score may be a score automatically set in a game system according to attire the virtual object; a historical achievement score of the virtual object exceeds an achievement score threshold, where the historical achievement score is an average of historical scores in a historical combat record of the virtual object; a number of historical matches of the virtual object exceeds a number-of-matches threshold, where the number of historical matches refers to a number of matches within a set time range, for example, a number of matches in the past month; an account corresponding to the virtual object has a permission of displaying the projected avatar; or an account grade corresponding to the virtual object exceeds an account grade threshold. When at least one of the foregoing conditions is met, projected avatars respectively corresponding to virtual objects can be automatically displayed. For example, projected avatars of virtual objects with avatar scores exceeding the score threshold can be automatically displayed. The data representing the threshold may be a fixed value or a numerical value corresponding to a ranking set in a sorting result. For example, avatar scores of all virtual objects in a virtual scene are sorted in descending order, and an avatar score ranked at the fourth position may be configured as the score threshold. Through the embodiments of this application, the utilization rate of display resources can be improved, thereby avoiding waste of display resources caused by displaying projected avatars of an excessive large number of virtual objects.

In some embodiments, the foregoing automatically displaying the projected avatar respectively corresponding to the at least one virtual object in the virtual scene may be implemented through the following technical solution: performing any of the following processing: automatically displaying the projected avatar of the at least one virtual object when the virtual scene is in a matching stage before a match or in a summing-up stage after a match ends; or displaying the projected avatar of the at least one virtual object when the virtual scene is in a match and an intention to view the projected avatar corresponding to the at least one virtual object is detected. Through the embodiments of this application, different strategies may be configured according to different stages to display projected avatars. For example, projected avatars of virtual objects that meet a condition may be directly displayed before and after a match. During the match, whether there is an intention to view a projected avatar of a virtual object needs to be detected, so as to avoid interference of displaying of the projected avatar on a normal interaction during the match, thereby improving the utilization rate of display resources.

In an example, for complex interactions in a match, and therefore whether there is an intention to view a projected avatar of a virtual object needs to be detected. Detection may be performed through artificial intelligence. First, real-time scene data of a virtual scene is obtained; and a first neural network model is called to extract a real-time scene feature from the real-time scene data, perform mapping on the real-time scene feature, to obtain a probability of needing to display a first projected avatar in the current virtual scene, and when the probability exceeds a probability threshold, determine that there is an intention to view the projected avatar corresponding to the at least one virtual object. The detection method through artificial intelligence configured here may be polling detection, by which detection is executed at a fixed time interval. The following describes a training method for the first neural network model. The method includes: obtaining sample data, where the sample data may be scene data at any historical moment, the scene data includes scene environment data, combat data, operation data in a scene, or the like; extracting a historical scene features from the scene data at the historical moment, where the feature extraction process here may be implemented through a convolutional layer; then mapping the historical scene feature into a probability value through a fully-connected layer, where the probability value represents the possibility of existence of an intention to view a projected avatar of a virtual object, and when a trigger operation on an avatar view prop is detected at the historical moment, a label value of the sample data is 1, or otherwise, the label value of the sample data is 0; constructing a loss by using an error between the label value and the probability value, to obtain a parameter change value of the first neural network model when the loss is minimum; and then updating the first neural network model by using the parameter change value.

In an example, in the embodiments of this application, whether there is an intention to view a projected avatar of a virtual object may alternatively be determined by using a duration of the virtual object staying in a field of view of a target virtual object. The target virtual object is a virtual object controlled by an account logged into a human-computer interaction interface. When the duration of the virtual object staying in the field of view of the target virtual object exceeds a duration threshold, a user is interested in attire of the virtual object, and therefore a projected avatar of the virtual object may be automatically displayed.

In some embodiments, in operation 102, displaying the projected avatar respectively corresponding to the at least one virtual object in the virtual scene may be implemented through the following technical solution: displaying the projected avatar in the virtual scene according to a first display style, where a display parameter of the first display style is positively correlated with the object parameter of the virtual object corresponding to the projected avatar and the display parameter includes at least one of the following: a size or a resolution; and the object parameter includes at least one of the following: an avatar score of the virtual object, a historical achievement score of the virtual object, or a number of historical matches of the virtual object.

In an example, display styles of projected avatars may be unified, or display styles of projected avatars may be diversified. For example, a degree of saliency of a display style of a projected avatar is positively correlated with an object parameter. A higher avatar score of a virtual object indicates a higher degree of saliency, for example, a larger size, of a projected avatar. By displaying projected avatars in differentiated display styles, information display efficiency can be improved, and users can sense more information in the process of displaying the projected avatars, so that the information display efficiency can be improved.

Operation 103: Update, in response to transformation of a first virtual object from a first avatar to a second avatar among the at least one virtual object, a first projected avatar corresponding to the first avatar and displayed in the virtual scene to a second projected avatar corresponding to the second avatar.

In an example, the embodiments of this application involve two types of accounts, a first account and a second account. The first account is an account configured for logging into a first client. A human-computer interaction interface is an interface of the first client. The second account is an account configured for logging into a second client. Another human-computer interaction interface is an interface of the second client. The first virtual object may be a virtual object controlled by the first account or may be a virtual object controlled by the second account. When the first virtual object is a virtual object controlled by the first account, the first virtual object is within a field of view of a user of the first account. When the first virtual object is a virtual object controlled by the second account, the first virtual object may be within a field of view of a user of the first account or may not be within the field of view of the user of the first account.

In some embodiments, referring to FIG. 4C, FIG. 4C is a schematic flowchart of a data processing method for a virtual scene according to an embodiment of this application. When the first virtual object is a virtual object controlled in a second client corresponding to another human-computer interaction interface, operation 107 and operation 108 shown in FIG. 4C may be performed before updating the first projected avatar corresponding to the first avatar displayed in the virtual scene to the second projected avatar corresponding to the second avatar in operation 103.

Operation 107: Receive second avatar data of the second avatar corresponding to the first virtual object.

In an example, first avatar data corresponding to each wearing component in the first avatar is stored in a initial avatar array and second avatar data corresponding to each wearing component in the second avatar is stored in a target avatar array, the target avatar array being obtained by updating the initial avatar array. Avatar data not only includes appearance resources and equipment strings, but also includes character action and pose parameters, so as to implement real-time projection of character actions and appearance.

Operation 108: Synchronize the second avatar data to the second avatar component mounted with the projected avatar model and render the second avatar data from the second avatar component to the projected avatar model, to obtain the second projected avatar.

In an example, in the foregoing embodiment, the first virtual object is a virtual object controlled by the second account. Correspondingly, if the avatar of the virtual object controlled by the second account changes, a projected avatar change caused by an avatar change is displayed to the first account.

In an example, when avatars of a plurality of virtual objects change, a virtual object meeting the following conditions is configured as the first virtual object to receive the second avatar data of the first virtual object: a virtual object having a physical distance less than a first physical distance threshold from the second virtual object controlled by the first account (representing that a physical distance between the first virtual object and the second virtual object in the virtual scene map is less than a first physical threshold, where the first physical threshold may be set by a player), or a virtual object having a social interaction distance less than a social interaction distance threshold from the second virtual object controlled by the first account (the social interaction distance is configured for representing a degree of association between an account controlling the first virtual object and an account controlling the second virtual object in the social interaction network; for example, if the two accounts have a friend relationship, the social interaction distance is 1; if the two accounts have a common friend, the social interaction distance is 2; the social interaction distance threshold may be set by a player), or a virtual object in a same group as the second virtual object controlled by the first account, or a virtual object having had an interaction event with the second virtual object controlled by the first account. By selecting the first virtual object, updating of projected avatars of a large number of virtual objects can be avoided, so that communication resources and rendering computing resources can be effectively saved.

In an example, when the avatar of the first virtual object undergoes a plurality of times of changes, the second avatar data needs not to be synchronized with the other clients each time a change occurs, and a time interval between a first moment and a second moment being greater than a time interval threshold needs to be met. The first moment is a moment when the second avatar data is received this time, and the second moment is a moment when the second avatar data is most recently received. Therefore, frequent updates of the projected avatar caused by frequent changes in the avatar can be avoided, and communication resources and rendering computing resources are saved.

Figure 4D:
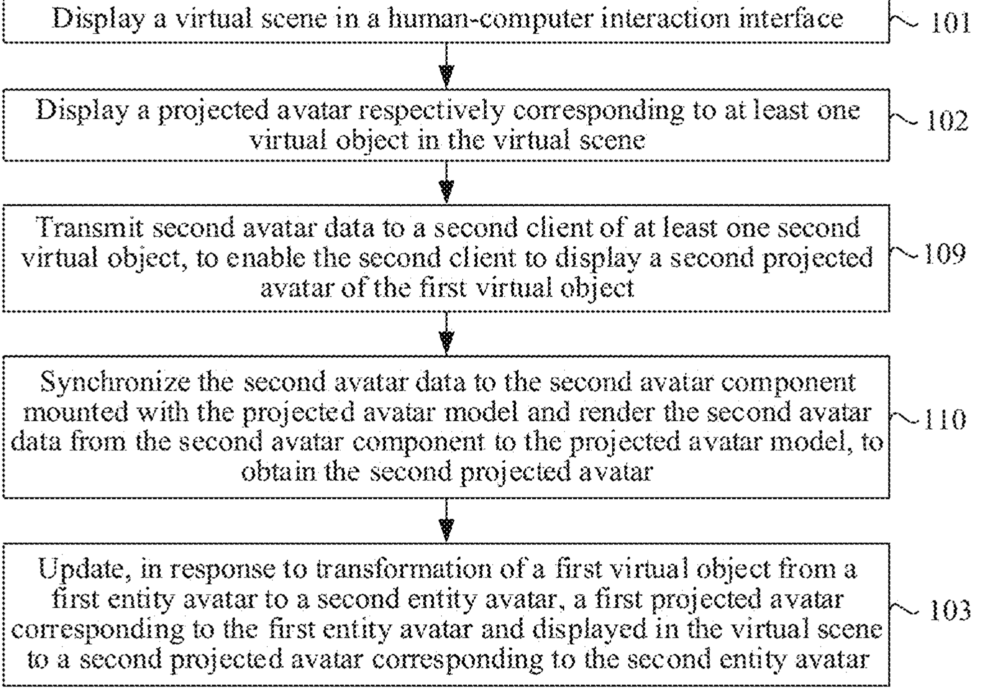

In some embodiments, referring to FIG. 4D, FIG. 4D is a schematic flowchart of a data processing method for a virtual scene according to an embodiment of this application. When the first virtual object is a virtual object controlled in a first client corresponding to a human-computer interaction interface, operation 109 and operation 110 shown in FIG. 4D may be performed before updating the first projected avatar corresponding to the first avatar displayed in the virtual scene to the second projected avatar corresponding to the second avatar in operation 103.

Operation 109: Transmit second avatar data to a second client of at least one second virtual object, to enable the second client to display a second projected avatar of the first virtual object.

Avatar data not only includes appearance resources and equipment strings, but also includes character action and pose parameters, so as to implement real-time projection of character actions and appearance.

In operation 109, the first virtual object is the virtual object controlled by the first account. Correspondingly, if the avatar of the virtual object controlled by the first account changes, a projected avatar change caused by an avatar change is displayed to the second account. The second virtual object is a virtual object controlled by the second account in the second client corresponding to another human-computer interaction interface.

First avatar data corresponding to each wearing component in the first avatar is stored in a initial avatar array and second avatar data corresponding to each wearing component in the second avatar is stored in a target avatar array, the target avatar array being obtained by updating the initial avatar array.

In some embodiments, in operation 109, transmitting the second avatar data to the second client of the at least one second virtual object may be implemented through the following technical solution: transmitting the second avatar data to the second client when a similarity between the first avatar and the second avatar is less than a similarity threshold.

In an example, after the avatar of the first virtual object changes, the change is not synchronized to the client of the second virtual object. Whether to synchronize the second avatar data outwards is determined based on a magnitude of the avatar change. For example, if the first virtual object only changes the size of a helmet, or if the first virtual object only changes the color of shoes, a degree of similarity between the first avatar and the second avatar is greater than a degree-of-similarity threshold. Therefore, the second avatar data needs not to be transmitted to the second client. Through the embodiments of this application, the update frequency of the projected avatars can be reduced, so that utilization rates of the communication resources and the rendering computing resources are improved.

In some embodiments, obtaining the second virtual object meeting at least one of the following conditions: a physical distance between the second virtual object and the first virtual object is less than a first physical distance threshold (representing that a physical distance between the first virtual object and the second virtual object in the virtual scene map is less than a first physical threshold, where the first physical threshold may be set by a player); a social interaction distance between the second virtual object and the first virtual object is less than a social interaction distance threshold, where the social interaction distance threshold may be set by a player, and the social interaction distance represents a degree of closeness between the second account controlling the second virtual object and the first account controlling the first virtual object; for example, if the first account and the second account have a direct social interaction relationship, the social interaction distance between the first virtual object and the second virtual object is 1; if both the first account and the second account are friends of a third account, the social interaction distance between the first virtual object and the second virtual object is 2; the second virtual object and the first virtual object are in a same group, which represents that the first virtual object and the second virtual object are in a same camp; or the second virtual object has had an interaction event with the first virtual object, for example, liking, commenting, or teaming up.

In an example, due to the fat that there are a plurality of virtual objects in the virtual scene except the first virtual object, the first virtual object does not need to synchronize the second avatar data with all of the other virtual objects. Therefore, a second virtual object may be selected by using a condition, and only a virtual object meeting the condition can be configured as the second virtual object. Therefore, utilization rates of communication resources and rendering computing resources can be improved.

In some embodiments, a time interval between a first moment and a second moment is greater than a time interval threshold, where the first moment is a moment when the second avatar data is transmitted to the second client and the second moment is a moment when an avatar of the first virtual object has latest changed and a change situation is synchronized with the second client.

In an example, when the avatar of the first virtual object undergoes a plurality of times of changes, the second avatar data needs not to be synchronized with the other clients each time a change occurs, and a time interval between a first moment and a second moment being greater than a time interval threshold needs to be met. The first moment is a moment when the second avatar data is transmitted to the second client, and the second moment is a moment when the avatar of the first virtual object has latest changed and a change situation is synchronized with the second client. Therefore, frequent updates of the projected avatar caused by frequent changes in the avatar can be avoided, and communication resources and rendering computing resources are saved.

In some embodiments, any of the following processing is performed, to obtain a time interval threshold: obtaining a time interval threshold negatively correlated with an object parameter of the first virtual object, where the object parameter includes at least one of the following: an avatar score of the first virtual object, a historical achievement score of the first virtual object, or a number of historical matches of the first virtual object; or obtaining a historical moment of each avatar transformation of the first virtual object, determining a plurality of historical time intervals based on the plurality of historical moments, and averaging the plurality of historical time intervals, to obtain the time interval threshold.

In an example, the time interval threshold is negatively correlated with an object parameter of the first virtual object. A larger the object parameter indicates a smaller time interval threshold. For example, a higher avatar score of the first virtual object indicates a smaller time interval threshold, which represents that a higher avatar score of the first virtual object indicates a higher allowed frequency of updating the projected avatar of the first virtual object. Through the embodiments of this application, users can be incentivized to obtain more avatar scores, participate in more matches, or the like in the virtual scene. The time interval threshold may alternatively be obtained by averaging historical time intervals, so that excessively frequent updates can be avoided by using a usual update frequency, and communication resources and rendering computing resources are saved.

Operation 110: Synchronize the second avatar data to the second avatar component mounted with the projected avatar model and render the second avatar data from the second avatar component to the projected avatar model, to obtain the second projected avatar.

In some embodiments, when the first virtual object is a virtual object controlled in the second client corresponding to another human-computer interaction interface and the second virtual object is a virtual object controlled in the first client corresponding to the human-computer interaction interface, interaction information corresponding to the interaction operation to the second client corresponding to the first virtual object is transmitted in response to an interaction operation for the projected avatar of the first virtual object by the second virtual object, to enable the second client to return response information for the interaction information to the first client; and the response information is presented in the first client through the projected avatar of the first virtual object. The second virtual object other than the first virtual object may interact with the first virtual object, and the interaction information may be transmitted downstream to the client used by the account controlling the first virtual object and the client used by the account controlling the second virtual object, so that the space for interactive social interaction is increased.

In an example, interaction forms include but are not limited to co-dancing with a projected avatar, liking a projected avatar, or giving a gift to a projected avatar. In response to a liking operation on the first virtual object by the second virtual object, the interaction information is liking information corresponding to the liking operation, and enhanced displaying is performed on the first projected avatar of the first virtual object; and the enhanced displaying may serve as response information; in response to a gift giving operation on the first virtual object, the interaction information is gift information corresponding to the gift giving operation, a gift receiving action executed by the first virtual object is displayed; and the gift receiving action is response information; or in response to a co-dancing invitation operation on the first virtual object, a process of co-dancing between the first virtual object and the second virtual object is displayed; and a co-dancing action of the first virtual object is response information.

Through the embodiments of this application, by updating, in response to transformation of a first virtual object from a first avatar to a second avatar among the at least one virtual object, a first projected avatar corresponding to the first avatar and displayed in the virtual scene to a second projected avatar corresponding to the second avatar, the change of the avatar of the virtual object by a player can be synchronized on the projected avatar in real time, thereby greatly improving the overall freedom of avatar display and the human-machine interaction efficiency.

The following describes an exemplary application of the embodiments of this application in a practical application scenario.

In some embodiments, a first account logs into a client (for example, a network-version game application) run in the terminal, a virtual object controlled by the first account is a first virtual object, and the client receives an avatar change operation of the first account. The first virtual object displayed by the client run in the terminal is transformed from a first avatar to a second avatar, and the client generates second avatar data corresponding to the second avatar and transmits the second avatar data to the server. The server transmits the second avatar data to a client run in the terminal. A second account logs into the client run in the terminal and a virtual object controlled by the second account is a second virtual object. The terminals perform rendering based on the second avatar data, to obtain a second projected avatar corresponding to the second avatar, and the clients of the terminals display the second projected avatar and no longer display a first projected avatar corresponding to the first avatar.

To balance the pressure of loading performance and display effects in related art, player avatars (including 2D silhouettes and 3D models) configured for global displaying are pre-loaded before entering a match. Therefore, when a player has an appearance change behavior including put-on and take-off of clothing and equipment picking within the match, the pre-loaded player avatar does not change in real time. The lack of real-time appearance display may lead to factual deviation, and as a result the cognition of a player is interfered with. Through the embodiments of this application, the performance limitations of hardware loading and display are broken through by using a new data replication mechanism and a parameter transmission pipeline. The rendered projected avatars synchronize a physical attire change of a character of a player in real time, so that the physical attire of the character of the player can be projected with a high quality in real time.

In some embodiments, the embodiments of this application provide a method for synchronously transmitting character avatar states for holographic model projection. In a game process, a player changes clothing by using an avatar component corresponding to a character of a virtual object. During each clothing change, the server synchronizes changed avatar data to all clients, and the avatar component maintains a set of avatar information, so as to ensure real-time consistency between the avatar information and the attire of the player. During display of a projected avatar of a virtual object, first a character corresponding to the virtual object is obtained, an avatar component is obtained through the character, then avatar data stored in the avatar component (for example, clothing data, or prop data) is read, and the avatar data is transmitted to the avatar component mounted to a projected character, so that real-time wearable copying and performance optimization are performed, thereby implementing dynamic updates of the appearance of the projected avatar.

In some embodiments, referring to FIG. 5, FIG. 5 is an interface diagram of a data processing method for a virtual scene according to an embodiment of this application. A human-computer interaction interface 501 displays a matching stage of a virtual scene, and a projected avatar 503 of a virtual object is displayed in a projection card 502. The projected avatar involved in the embodiments of this application may be a three-dimensional projected avatar such as a holographic projected avatar.

Figure 6:
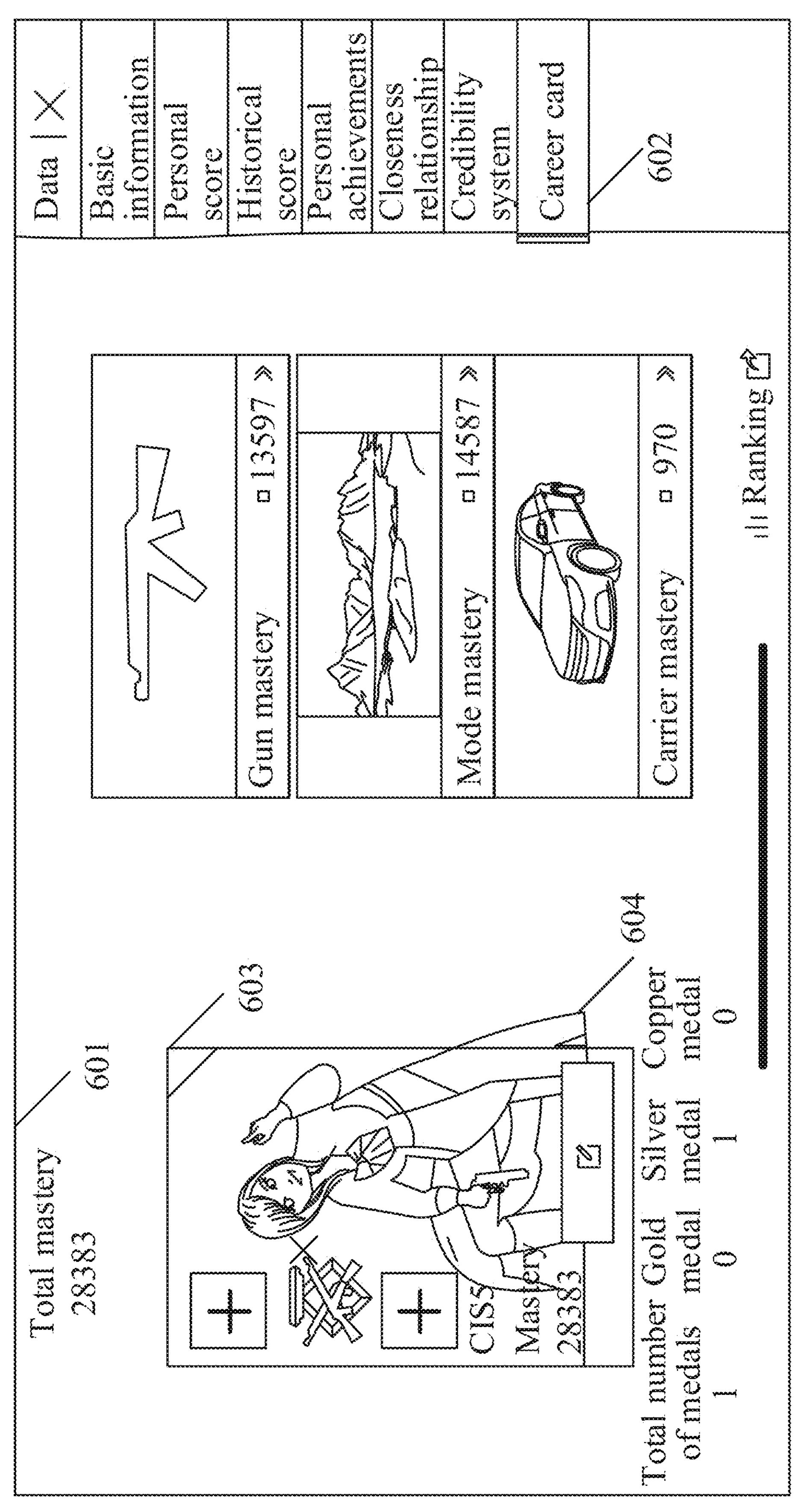
FIG. 6 is an interface diagram of a data processing method for a virtual scene according to an embodiment of this application.

In some embodiments, referring to FIG. 6, FIG. 6 is an interface diagram of a data processing method for a virtual scene according to an embodiment of this application. A human-computer interaction interface 601 displays a career card entrance 602 of a virtual object, and in response to a trigger operation on the career card entrance 602, a projected avatar 604 in a projection card 603 is displayed. The projection card herein may be interpreted as a personalized display panel.

Figure 7:
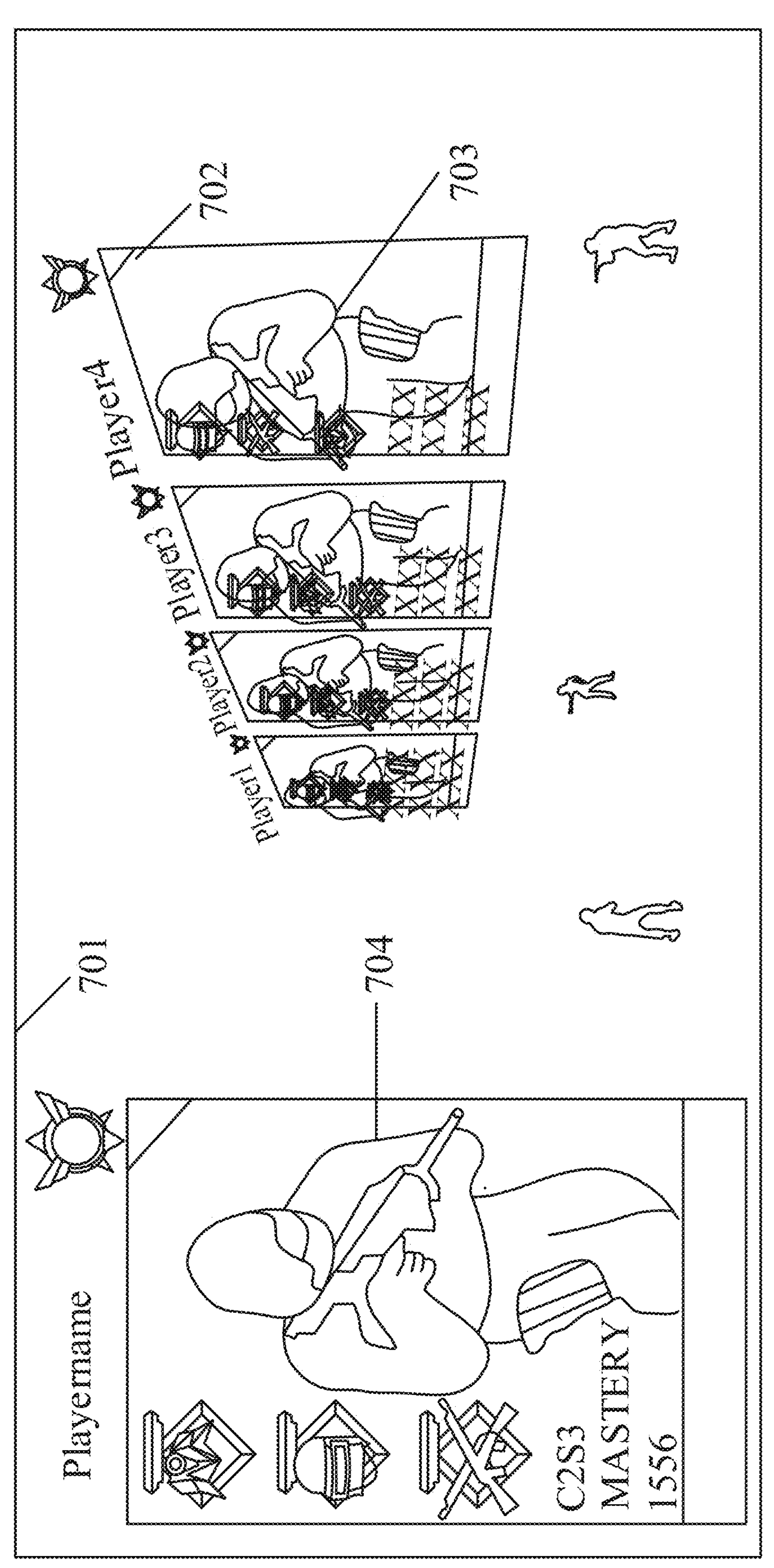
FIG. 7 is an interface diagram of a data processing method for a virtual scene according to an embodiment of this application.

In some embodiments, referring to FIG. 7, FIG. 7 is an interface diagram of a data processing method for a virtual scene according to an embodiment of this application. A human-computer interaction interface 701 displays a matching stage of a virtual scene, and a projected avatar 703 of a virtual object is displayed in a projection card 702. In response to a view operation on the target virtual object, a projected avatar 704 of the target virtual object is displayed. In a player matching stage of a match of a game, all players are to be born on an island, and wearing of avatars of players meeting a display condition are to be holographic projected onto a giant display stand in the center of the island in real time.

In some embodiments, referring to FIG. 8, FIG. 8 is a diagram of an interface of a data processing method for a virtual scene according to an embodiment of in this application embodiment. A human-computer interaction interface 801 displays a matching stage of a virtual scene, the human-computer interaction interface 801 displays an avatar of a virtual object 804, and a projected avatar 803 of the virtual object is displayed in a projection card 802. In other words, both the virtual object and the projected avatar of the virtual object are within a field of view, and synchronous transmission between the projected avatar of the virtual object and the avatar of the virtual object can be clearly displayed, so that wearing of the projection can be ensured to update in real time and always be consistent with an appearance of the character body.

Figure 9:
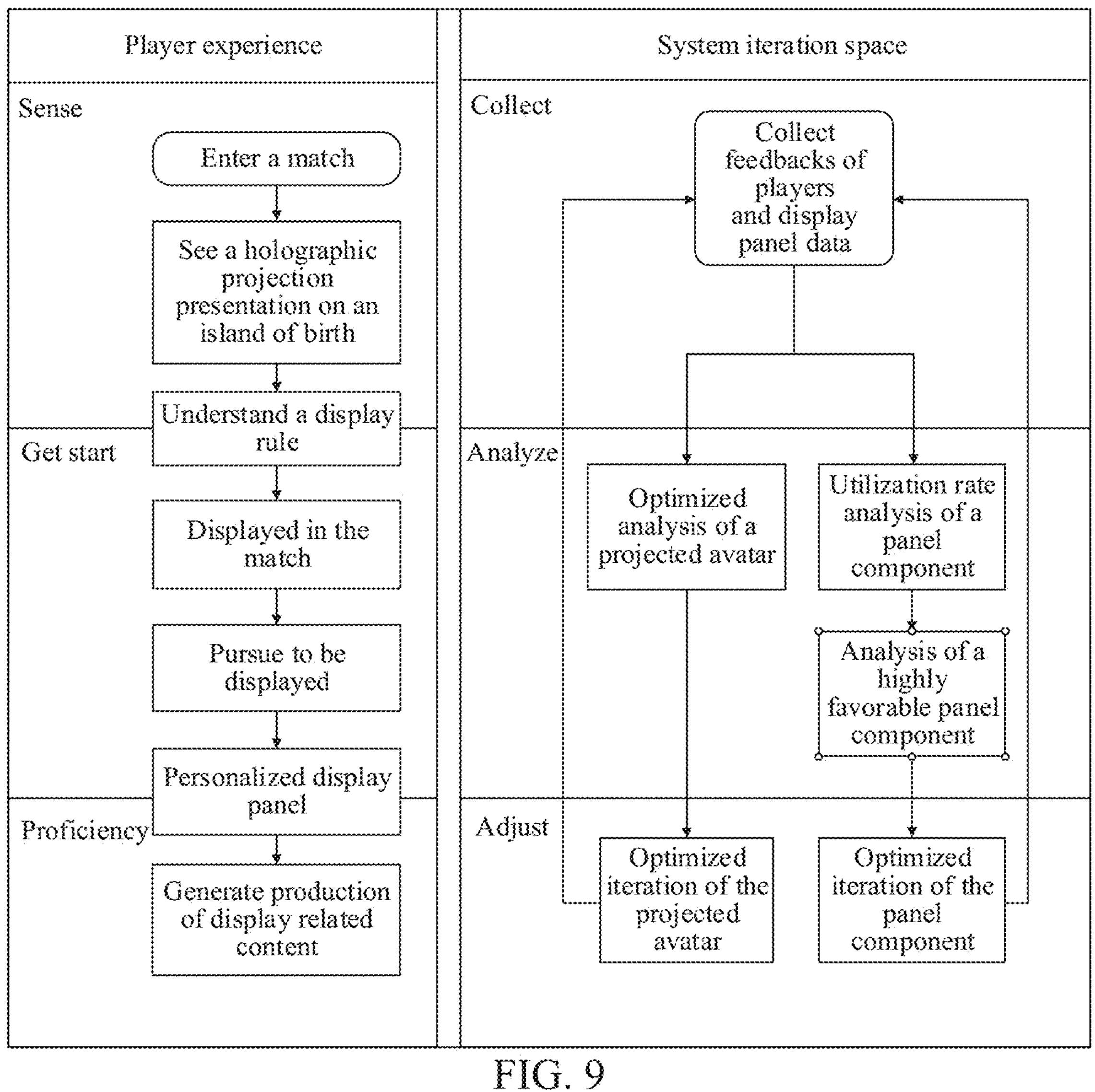
FIG. 9 is an experience diagram of a data processing method for a virtual scene according to an embodiment of this application.

Referring to FIG. 9, FIG. 9 is an experience diagram of a data processing method for a virtual scene according to an embodiment of this application. The following first describes an experience of players. In a perception stage, after entering a match, the players may see a holographic projection (projected avatar) displayed on an island of birth, quickly sense the projected avatar and learn about a mechanism of the projected avatar. In a getting started stage, the players may further be displayed with the projected avatar and start trying to obtain an opportunity of being displayed in the match. In a proficiency stage, the players may pay attention to personalized settings of respective display panels, and need to accumulate match behaviors, purchase virtual assets, and other behaviors to obtain the opportunity of being displayed. This process is gradual. Through the embodiments of this application, on the one hand, the players are provided with enriched gaming experiences and fun gameplay, and on the other hand, the players are provided with more in-match display channels. This mechanism for real-time transmission of character wearing avatars also greatly enhances the interactive feeling of virtual objects for avatar display. The following describes the R&D process of the developers. In the data collection stage, by collecting player feedback and preference data on the display panels, the display needs and avatar wearing preferences of the players can be better understood, which helps designers to continuously create content that is more popular with players; in the analysis phase, the developers conduct optimization analysis of avatar components, analysis of panel component utilization rate, and analysis of high popularity panel components. The high popularity refers to panel components having a utilization rate exceeding a utilization rate threshold. In the adjustment phase, the developers may iterate the avatar components and the panel components, and then enter the data collection phase after the adjustment.

Figure 10:
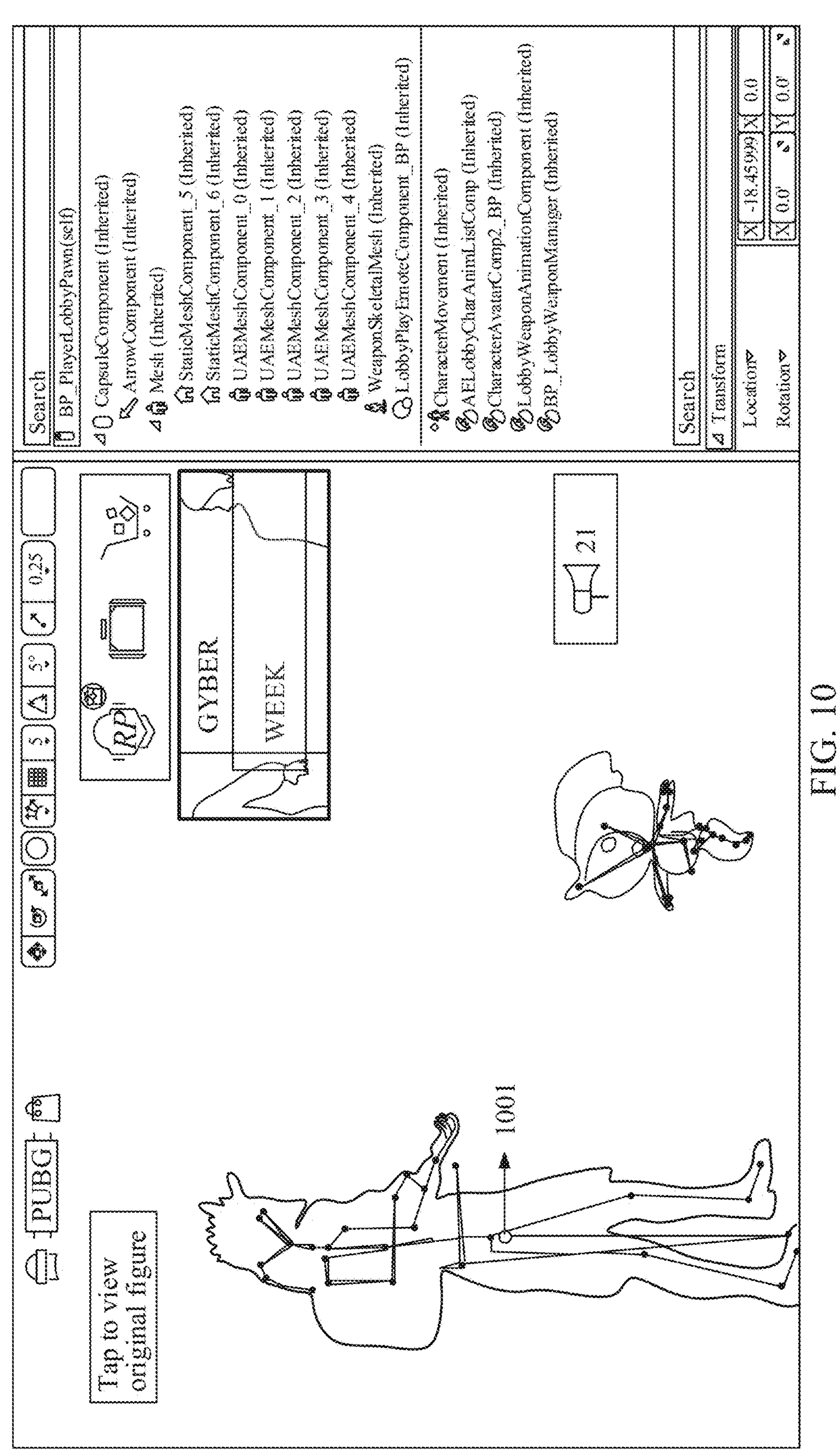
FIG. 10 is a schematic diagram of component disassembling in a development tool according to an embodiment of this application.

In some embodiments, FIG. 10 is a schematic diagram of component disassembling in a development tool according to an embodiment of this application. As shown in FIG. 10, mesh components are included, and configured to display an entire projected avatar. The mesh components include: a StaticMesh component for mounting medals, a WeaponSkeletalMesh (Inherited) component for mounting props, and a UAEMeshComponent (Inherited) component for mounting character models, for example, a component 1001 corresponding to a UAEMeshComponent_0 (Inherited) component. Key structures provided in the embodiments of this application are structures such as BlueprintReadWrite, Replicated, Transient, and ReplicatedUsing=OnRep_BodySlotStateChanged. The BlueprintReadWrite is a structure corresponding to text, the Replicated structure is a structure corresponding to attribute synchronization, the Transient is a structure marked as not serialized, and the ReplicatedUsing=OnRep_BodySlotStateChanged is a structure corresponding to the attribute replication.

In some embodiments, an appearance change operation by a player is implemented on a program side by using avatar components in a character. When a player changes a wearing avatar, a server may synchronize replaced avatar data to all clients in real time. The avatar data is stored in an array, and values in the array are configured for representing equipment information corresponding to each equipment slot. A character is divided into a plurality of parts, such as head, clothing, pants, backpacks, hair, or helmet. As shown in FIG. 10, each part represents an equipment slot, and each equipment slot may have corresponding equipment information. A set of avatar information is maintained by storing arrays of the structures in the avatar components. By using a method of value synchronization, when equipment information of an equipment slot changes, the server correspondingly changes the array storing the structures and synchronizes an updated array to each client. The avatar data and the wearing avatar of the player may be approximated as being consistent in real time. When a client receives the updated array, the client triggers a clothing wearing logic, determines, by using the updated array, identifiers of items for wearing, and obtains special effects resources or the like in a game engine; when a client receives the updated array, an avatar component mounted with a projected avatar may alternatively receive the updated array, so as to obtain updated avatar data, and put clothing represented by the avatar data onto a projection model by using a clothing wearability function. When rendering the projected avatar of the virtual object, first a character corresponding to the virtual object is obtained through a user account, and an avatar component corresponding to the character is obtained. Then, approximate real-time avatar data stored in the avatar component is read and transmitted to the avatar component mounted with the projected avatar.

Figure 11:
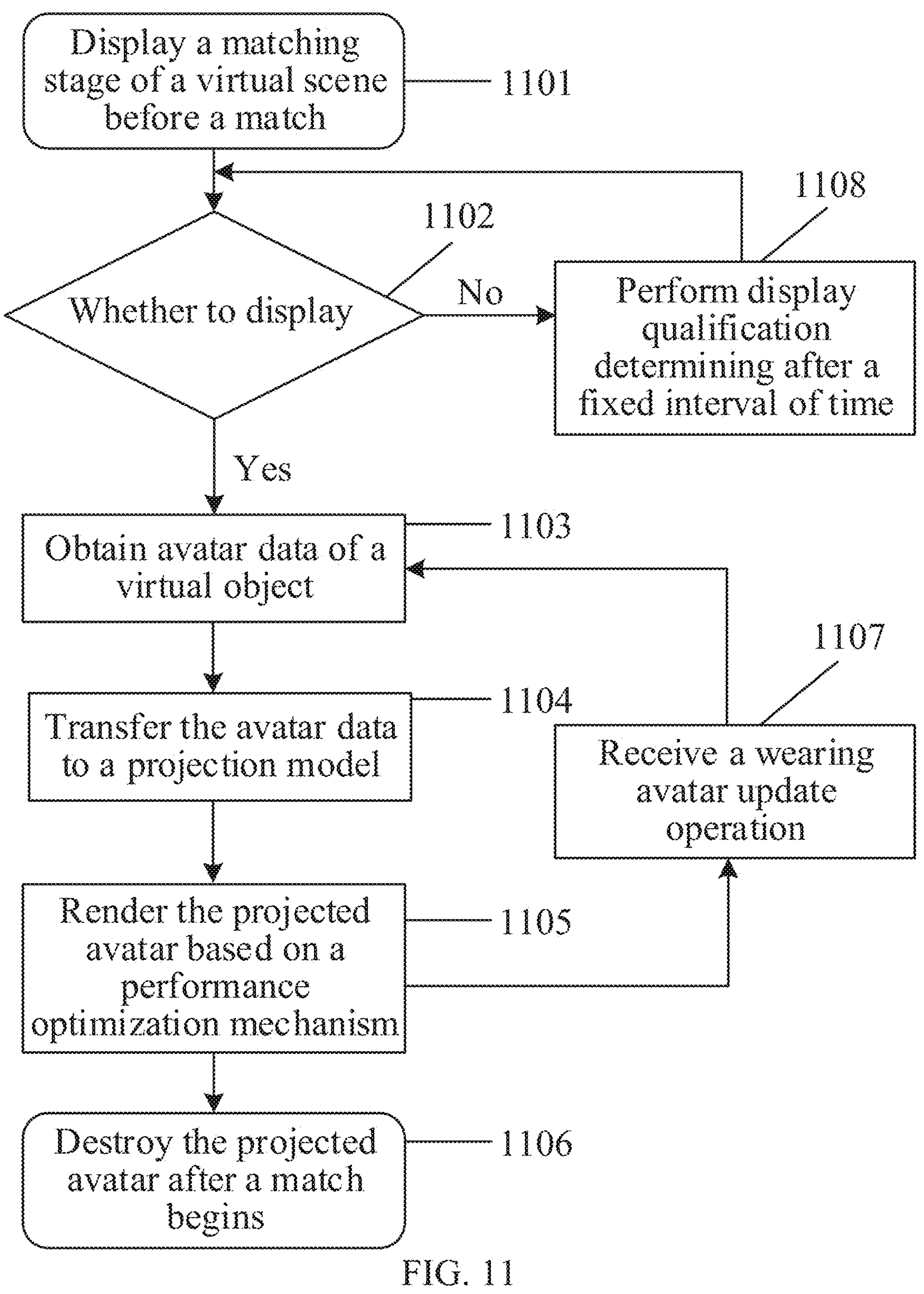
FIG. 11 is a flowchart of a video processing method for a virtual scene according to an embodiment of this application.

In some embodiments, referring to FIG. 11, FIG. 11 is a flowchart of a video processing method for a virtual scene according to an embodiment of this application.

Operation 1101: Display a matching stage of a virtual scene before a match.

Operation 1102: Determine whether a projected avatar of a virtual object is displayed; when the projected avatar of the virtual object is displayed, perform operation 1103; and when the projected avatar of the virtual object is not displayed, perform operation 1108.

Operation 1103: Obtain avatar data of the virtual object, specifically, read avatar data from a first avatar component corresponding to the avatar of the virtual object.

Operation 1104: Transmit the avatar data to a projection model, specifically, synchronize the avatar data to a second avatar component mounted with a projected avatar model.

Operation 1105: Render the projected avatar based on a performance optimization mechanism, whereby using the performance optimization mechanism, delay and performance consumption from obtaining the avatar data to changing the projected avatar are reduced; and then, perform operation 1106 and operation 1107, where operation 1106 and operation 1107 are performed in any order.

Operation 1106: Destroy the projected avatar after a match begins.

Operation 1107: Receive a wearing avatar update operation and turn to perform operation 1103.

Operation 1108: Perform display qualification determining after a fixed interval of time.

That is, whether the virtual object meets a projection display condition is determined. A virtual object meeting the projection display condition has a display qualification and a projected avatar of the virtual object is displayed. In a match matching stage, virtual objects are generated on an island of birth. When a player meets a display condition, equipment data (avatar data) of each equipment slot on the avatar component corresponding to the character of the virtual object is read and transmitted to the avatar component mounted with the projected avatar. Through a clothing wearing function, clothing represented by the avatar data is put onto a projection model.

In the embodiments of this application, a set of projected avatar data synchronized with the avatar data is independently maintained for the projected avatar, and by using the performance optimization mechanism, delay and performance consumption from obtaining the avatar data to changing the projected avatar are reduced. In terms of the number of models, on a high-end machine, the number of models can be reduced, for example, a medal and a medal base are integrated, and are made into one model during production; data such as scores and season is integrated into a three-dimensional user interface; equipment such as backpacks, helmets, and props is not added, to reduce generation of unnecessary components for characters, and to further reduce the number of models. On a low-end machine, an entire model may be made, and the entire model is configured for preparing rendering resources and performing rendering, and the number of times of rendering (DrawCall) is reduced by using a non-detachable mesh mode. The number of models can be reduced or increased according to measured data, so that the number of models matches the measured data. The measured data is performance measured data. In terms of resource loading, asynchronous frame loading is configured for reducing frame drops and lag in a game, so that performance pressure caused by simultaneous loading is avoided, thereby achieving the effect of real-time dynamic changes in the projection following changes in the appearance of the virtual object. When a match officially begins, projection related data is deleted and projected avatars are destroyed, to reduce internal memory pressure.

Through the embodiments of this application, attire changes to virtual objects by players can be synchronized in real time on the projected avatars, thereby greatly improving the overall display freedom and interaction efficiency, and providing the players with space for secondary content innovation. In the embodiments of this application, more visual displays may be provided for players without affecting the basic gaming experience, so that personalized display needs of the players are met.

In the embodiments of this application, relevant data related to user information is involved. When the embodiments of this application are applied to specific products or technologies, user permission or consent is required, and the collection, use, and processing of relevant data need to comply with relevant laws, regulations, and standards of relevant countries and regions.

The following continuously describe an exemplary structure of the data processing apparatus 455 for a virtual scene provided in the embodiments of this application as a software module. In some embodiments, as shown in FIG. 3, the software module stored in the data processing apparatus 455 for the virtual scene in the memory 450 may include: a first display module 4551, configured to display the virtual scene in a human-computer interaction interface; a second display module 4552, configured to display a projected avatar respectively corresponding to at least one virtual object in the virtual scene, the projected avatar being a projection of an avatar of the virtual object; and an update module 4553, configured to update, in response to transformation of a first virtual object among the at least one virtual object from a first avatar to a second avatar, a first projected avatar corresponding to the first avatar displayed in the virtual scene to a second projected avatar corresponding to the second avatar, the first virtual object being any one of at least one virtual object.

In some embodiments, before displaying the projected avatar respectively corresponding to the at least one virtual object in the virtual scene, the second display module 4552 is further configured to: perform the following processing for each virtual object: read avatar data from a first avatar component corresponding to an avatar of the virtual object; synchronize the avatar data to a second avatar component mounted with a projected avatar model; and render the avatar data from the second avatar component to the projected avatar model, to obtain the projected avatar.

In some embodiments, the second display module 4552 is further configured to: transmit a rendering instruction to a processor when performance of a terminal in which the virtual scene runs is less than a performance threshold, to enable the processor to render first avatar data to the projected avatar model at a time, so as to obtain the first projected avatar; and when the performance of the terminal in which the virtual scene runs is equal to or greater than the performance threshold, decompose the projected avatar model into a plurality of part models and transmit a rendering instruction to the processor for each part model, to enable the processor to render first avatar data to the part models in parts a plurality of times by using the part models as rendering units and merge a plurality of rendered part models, to obtain the first projected avatar.

In some embodiments, when the first virtual object is a virtual object controlled in a second client corresponding to another human-computer interaction interface, the update module 4553 is further configured to: receive second avatar data of the second avatar corresponding to the first virtual object; and synchronize the second avatar data to the second avatar component mounted with the projected avatar model and render the second avatar data from the second avatar component to the projected avatar model, to obtain the second projected avatar.

In some embodiments, when the first virtual object is a virtual object controlled in a first client corresponding to a human-computer interaction interface, before updating the first projected avatar corresponding to the first avatar displayed in the virtual scene to the second projected avatar corresponding to the second avatar, the update module 4553 is further configured to: transmit second avatar data to a second client of at least one second virtual object, to enable the second client to display a second projected avatar of the first virtual object, where the second virtual object is a virtual object controlled in a second client corresponding to another human-computer interaction interface; and synchronize the second avatar data to the second avatar component mounted with the projected avatar model and render the second avatar data from the second avatar component to the projected avatar model, to obtain the second projected avatar.

In some embodiments, first avatar data corresponding to each wearing component in the first avatar is stored in a initial avatar array and second avatar data corresponding to each wearing component in the second avatar is stored in a target avatar array, the target avatar array being obtained by updating the initial avatar array.

In some embodiments, the update module 4553 is further configured to: obtain the second virtual object meeting at least one of the following conditions: a physical distance between the second virtual object and the first virtual object is less than a first physical distance threshold; a social interaction distance between the second virtual object and the first virtual object is less than a social interaction distance threshold; the second virtual object and the first virtual object are in a same group; or the second virtual object has had an interaction event with the first virtual object.

In some embodiments, the update module 4553 is further configured to: transmit the second avatar data to the second client when a similarity between the first avatar and the second avatar is less than a similarity threshold.

In some embodiments, a time interval between a first moment when the second avatar data is transmitted to the second client and a second moment is greater than a time interval threshold, where the second moment is a moment when an avatar of the first virtual object has latest changed and a change situation is synchronized with the second client.

In some embodiments, the update module 4553 is further configured to: perform any of the following processing, to obtain a time interval threshold: obtaining a time interval threshold negatively correlated with an object parameter of the first virtual object, where the object parameter includes at least one of the following: an avatar score of the first virtual object, a historical achievement score of the first virtual object, or a number of historical matches of the first virtual object; or obtaining a historical moment of each avatar transformation of the first virtual object, determining a plurality of historical time intervals based on the plurality of historical moments, and averaging the plurality of historical time intervals, to obtain the time interval threshold.

In some embodiments, the second display module 4552 is further configured to: perform any of the following processing: displaying a projected avatar respectively corresponding to the at least one virtual object in the avatar view prop when the avatar view prop is triggered; automatically displaying the projected avatar corresponding to the at least one virtual object in response to that the at least one virtual object meets a projection display condition; or automatically displaying, for any one of the at least one virtual object, a projected avatar respectively corresponding to the virtual object.

In some embodiments, the projection display condition includes at least one of the following: an avatar score of the virtual object exceeds a score threshold; a historical achievement score of the virtual object exceeds an achievement score threshold; a number of historical matches of the virtual object exceeds a number-of-matches threshold; an account corresponding to the virtual object has a permission of displaying the projected avatar; or an account grade corresponding to the virtual object exceeds an account grade threshold.

In some embodiments, the second display module 4552 is further configured to: perform any of the following processing: displaying the projected avatar of the at least one virtual object when the virtual scene is in a matching stage before a match or in a summing-up stage after a match ends; or displaying the projected avatar of the at least one virtual object when the virtual scene is in a match and an intention to view the projected avatar corresponding to the at least one virtual object is detected.

In some embodiments, the second display module 4552 is further configured to: perform any of the following: displaying at least one candidate virtual object in the avatar view prop and displaying in the avatar view prop the projected avatar respectively corresponding to the at least one virtual object in response to a selection operation on the at least one candidate virtual object; or displaying in the avatar view prop a projected avatar corresponding to at least one virtual object within a set area, where the set area is an area having a physical distance with the avatar view prop less than a second physical distance threshold.

In some embodiments, the second display module 4552 is further configured to: display the projected avatar in the virtual scene according to a first display style, where a display parameter of the first display style is positively correlated with the object parameter of the virtual object corresponding to the projected avatar and the display parameter includes at least one of the following: a size or a resolution; and the object parameter includes at least one of the following: an avatar score of the virtual object, a historical achievement score of the virtual object, or a number of historical matches of the virtual object.

In some embodiments, the device further includes an interactive module 4554. When the first virtual object is a virtual object controlled in a second client corresponding to other human-computer interaction interfaces, and the second virtual object is a virtual object controlled in a first client corresponding to the human-computer interaction interface, the interactive module is further configured to: transmit, in response to an interaction operation for the projected avatar of the first virtual object by the second virtual object, interaction information corresponding to the interaction operation to the second client corresponding to the first virtual object, to enable the second client to return response information for the interaction information to the first client; and present in the first client the response information through the projected avatar of the first virtual object.

An embodiment of this application provides a computer program product, the computer program product including a computer program or a computer-executable instruction, and the computer program or the computer-executable instruction being stored in a computer-readable storage medium. A processor of an electronic device reads the computer-executable instruction from the computer-readable storage medium, and the processor executes the computer-executable instruction, so that the electronic device performs the data processing method for a virtual scene provided in the foregoing embodiments of this application.

An embodiment of this application provides a non-transitory computer-readable storage medium, having a computer-executable instruction stored therein, and the computer-executable instruction, when executed by a processor, causing the processor to perform the data processing method for a virtual scene provided in the foregoing embodiments of this application, for example, the data processing method for a virtual scene shown in FIG. 4A to FIG. 4D.

In some embodiments, the computer-readable storage medium may be a memory such as an FRAM, a ROM, a PROM, an EPROM, an EEPROM, a flash memory, a magnetic surface memory, an optical disc, or a CD-ROM; or may be various devices including one or any combination of the foregoing memories.

In some embodiments, the computer-executable instruction may be in a form of a program, software, a software module, scripts, or code, written in any form of programming language (including compiling or interpreting languages, or declarative or procedural languages), and may be deployed in any form, including being deployed as a standalone program or as a module, a component, a subroutine, or another unit suitable for use in a computing environment.

For example, the computer-executable instructions may, but do not necessarily, correspond to a file in a file system, may be stored as part of a file holding other programs or data, for example, in one or more scripts stored in a hypertext markup language (HTML) document, in a single file exclusively used in a program in question, or in a plurality of collaborative files (for example, files having one or more modules, subroutines, or code portions stored therein).

For example, the computer-executable instruction may be deployed for execution on one electronic device, or on a plurality of electronic devices located at one location, or on a plurality of electronic devices distributed at a plurality of locations and interconnected via a communication network.

In summary, when the first virtual object in the at least one virtual object is transformed from the first avatar to the second avatar, the first projected avatar corresponding to the first avatar displayed in the virtual scene is updated to the second projected avatar corresponding to the second avatar, to display a change in the avatar of the virtual object by using a projected avatar as a medium. Compared with sensing an avatar only in a face-to-face mode in the related art, the ways of sensing a virtual avatar in a virtual scene are expanded, and the avatar display is more flexible and free, and the user experience is improved.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely preferred embodiments of this application and are not intended to limit the protection scope of this application. Any modification, equivalent replacement, or improvement made without departing from the spirit and principle of this application shall fall within the protection scope of this application.

What is claimed is:

1. A method for processing data a virtual scene performed by an electronic device, the method comprising:

displaying a plurality of projected avatars, each avatar corresponding to a respective one of a plurality of virtual objects in the virtual scene;

detecting, among the plurality of virtual objects, a transformation of a first virtual object from a first avatar to a second avatar;

updating a first projected avatar corresponding to the first avatar to a second projected avatar corresponding to the second avatar in response to the transformation, further including:

reading avatar data from a first avatar component corresponding to the first virtual object;

synchronizing the avatar data to a second avatar component mounted with a projected avatar model; and rendering the avatar data from the second avatar component to the projected avatar model, to obtain the second projected avatar.

2. The method according to claim 1, wherein the rendering the avatar data from the second avatar component to the projected avatar model, to obtain the second projected avatar comprises:

transmitting a rendering instruction to a processor when performance of a terminal in which the virtual scene runs is less than a performance threshold, to enable the processor to render first avatar data to the projected avatar model at a time, so as to obtain the first projected avatar; and when the performance of the terminal in which the virtual scene runs is equal to or greater than the performance threshold, decomposing the projected avatar model into a plurality of part models and transmitting a rendering instruction to the processor for each part model, to enable the processor to render first avatar data to the part models in parts a plurality of times by using the part models as rendering units and merge a plurality of rendered part models, to obtain the first projected avatar.

3. The method according to claim 1, wherein the first virtual object is a virtual object controlled in a second client, before updating a first projected avatar corresponding to the first avatar to a second projected avatar corresponding to the second avatar, the method further comprises:

receiving second avatar data of the second avatar corresponding to the first virtual object;

synchronizing the second avatar data to the second avatar component mounted with the projected avatar model; and rendering the second avatar data from the second avatar component to the projected avatar model, to obtain the second projected avatar.

4. The method according to claim 1, wherein the first virtual object is a virtual object controlled in a first client, before updating a first projected avatar corresponding to the first avatar to a second projected avatar corresponding to the second avatar, the method further comprises:

transmitting second avatar data to a second client of at least one second virtual object, to enable the second client to display a second projected avatar of the first virtual object;

synchronizing the second avatar data to the second avatar component mounted with the projected avatar model; and rendering the second avatar data from the second avatar component to the projected avatar model, to obtain the second projected avatar.

5. The method according to claim 1, wherein first avatar data corresponding to each wearing component in the first avatar is stored in a initial avatar array and second avatar data corresponding to each wearing component in the second avatar is stored in a target avatar array, the target avatar array being obtained by updating the initial avatar array.

6. The method according to claim 4, wherein the method further comprises:

obtaining the second virtual object meeting at least one of the following conditions:

a physical distance between the second virtual object and the first virtual object is less than a first physical distance threshold;

a social interaction distance between the second virtual object and the first virtual object is less than a social interaction distance threshold;

the second virtual object and the first virtual object are in a same group; or the second virtual object has had an interaction event with the first virtual object.

7. The method according to claim 4, wherein the transmitting second avatar data to a second client of at least one second virtual object comprises:

transmitting the second avatar data to the second client when a similarity between the first avatar and the second avatar is less than a similarity threshold.

8. The method according to claim 4, wherein a time interval between a first moment and a second moment is greater than a time interval threshold, wherein the first moment is a moment when the second avatar data is transmitted to the second client and the second moment is a moment when an avatar of the first virtual object has latest changed and a change situation is synchronized with the second client.

9. The method according to claim 1, wherein the displaying a plurality of projected avatars, each avatar corresponding to a respective one of a plurality of virtual objects in the virtual scene comprises:

performing any of the following processing:

displaying an avatar view prop in the virtual scene, the avatar view prop including a projected avatar corresponding to a respective one of a plurality of virtual objects in the virtual scene in response to a trigger operation on the avatar view prop; and automatically displaying, for any one of the plurality of virtual objects, a projected avatar respectively corresponding to the virtual object.

10. The method according to claim 1, wherein the displaying a plurality of projected avatars, each avatar corresponding to a respective one of a plurality of virtual objects in the virtual scene comprises:

displaying each projected avatar in the virtual scene according to a first display style, wherein a display parameter of the first display style is positively correlated with the object parameter of the virtual object corresponding to the projected avatar and the display parameter comprises at least one of the following: a size or a resolution; and the object parameter comprises at least one of the following: an avatar score of the virtual object, a historical achievement score of the virtual object, and a number of historical matches of the virtual object.

11. The method according to claim 1, wherein the first virtual object is a virtual object controlled in a second client and the second virtual object is a virtual object controlled in a first client, the method further comprises:

in response to an interaction operation for the projected avatar of the first virtual object by the second virtual object, transmitting interaction information corresponding to the interaction operation to the second client corresponding to the first virtual object, to enable the second client to return response information for the interaction information to the first client; and presenting in the first client the response information through the projected avatar of the first virtual object.

12. An electronic device, comprising:

a memory, configured to store a computer-executable instruction; and a processor, configured to, when executing the computer-executable instruction stored in the memory, cause the electronic device to perform a method for processing data a virtual scene including:

displaying a plurality of projected avatars, each avatar corresponding to a respective one of a plurality of virtual objects in the virtual scene;

detecting, among the plurality of virtual objects, a transformation of a first virtual object from a first avatar to a second avatar;

updating a first projected avatar corresponding to the first avatar to a second projected avatar corresponding to the second avatar in response to the transformation, further including:

reading avatar data from a first avatar component corresponding to the first virtual object;

synchronizing the avatar data to a second avatar component mounted with a projected avatar model; and rendering the avatar data from the second avatar component to the projected avatar model, to obtain the second projected avatar.

13. The electronic device according to claim 12, wherein the first virtual object is a virtual object controlled in a second client, before updating a first projected avatar corresponding to the first avatar to a second projected avatar corresponding to the second avatar, the method further comprises:

receiving second avatar data of the second avatar corresponding to the first virtual object;

synchronizing the second avatar data to the second avatar component mounted with the projected avatar model; and rendering the second avatar data from the second avatar component to the projected avatar model, to obtain the second projected avatar.

14. The electronic device according to claim 12, wherein the first virtual object is a virtual object controlled in a first client, before updating a first projected avatar corresponding to the first avatar to a second projected avatar corresponding to the second avatar, the method further comprises:

transmitting second avatar data to a second client of at least one second virtual object, to enable the second client to display a second projected avatar of the first virtual object;

synchronizing the second avatar data to the second avatar component mounted with the projected avatar model; and rendering the second avatar data from the second avatar component to the projected avatar model, to obtain the second projected avatar.

15. The electronic device according to claim 12, wherein first avatar data corresponding to each wearing component in the first avatar is stored in an initial avatar array and second avatar data corresponding to each wearing component in the second avatar is stored in a target avatar array, the target avatar array being obtained by updating the initial avatar array.

16. The electronic device according to claim 12, wherein the displaying a plurality of projected avatars, each avatar corresponding to a respective one of a plurality of virtual objects in the virtual scene comprises:

displaying each projected avatar in the virtual scene according to a first display style, wherein a display parameter of the first display style is positively correlated with the object parameter of the virtual object corresponding to the projected avatar and the display parameter comprises at least one of the following: a size or a resolution; and the object parameter comprises at least one of the following: an avatar score of the virtual object, a historical achievement score of the virtual object, and a number of historical matches of the virtual object.

17. The electronic device according to claim 12, wherein the first virtual object is a virtual object controlled in a second client and the second virtual object is a virtual object controlled in a first client, the method further comprises:

in response to an interaction operation for the projected avatar of the first virtual object by the second virtual object, transmitting interaction information corresponding to the interaction operation to the second client corresponding to the first virtual object, to enable the second client to return response information for the interaction information to the first client; and presenting in the first client the response information through the projected avatar of the first virtual object.

18. A non-transitory computer-readable storage medium, having a computer-executable instruction stored therein, and the computer-executable instruction, when executed by a processor of an electronic device, causing the electronic device to perform a method for processing data a virtual scene including:

displaying a plurality of projected avatars, each avatar corresponding to a respective one of a plurality of virtual objects in the virtual scene;

detecting, among the plurality of virtual objects, a transformation of a first virtual object from a first avatar to a second avatar;

updating a first projected avatar corresponding to the first avatar to a second projected avatar corresponding to the second avatar in response to the transformation, further including:

reading avatar data from a first avatar component corresponding to the first virtual object;

synchronizing the avatar data to a second avatar component mounted with a projected avatar model; and rendering the avatar data from the second avatar component to the projected avatar model, to obtain the second projected avatar.

19. The non-transitory computer-readable storage medium according to claim 18, wherein the first virtual object is a virtual object controlled in a second client, before updating a first projected avatar corresponding to the first avatar to a second projected avatar corresponding to the second avatar, the method further comprises:

receiving second avatar data of the second avatar corresponding to the first virtual object;

synchronizing the second avatar data to the second avatar component mounted with the projected avatar model; and rendering the second avatar data from the second avatar component to the projected avatar model, to obtain the second projected avatar.

20. The non-transitory computer-readable storage medium according to claim 18, wherein the first virtual object is a virtual object controlled in a first client, before updating a first projected avatar corresponding to the first avatar to a second projected avatar corresponding to the second avatar, the method further comprises:

transmitting second avatar data to a second client of at least one second virtual object, to enable the second client to display a second projected avatar of the first virtual object;

synchronizing the second avatar data to the second avatar component mounted with the projected avatar model; and rendering the second avatar data from the second avatar component to the projected avatar model, to obtain the second projected avatar.

* * * * *